(12) United States Patent
Decker et al.

(10) Patent No.: US 9,056,988 B2
(45) Date of Patent: Jun. 16, 2015

(54) SOLAR REFLECTIVE COATINGS AND COATING SYSTEMS

(75) Inventors: Eldon L. Decker, Gibsonia, PA (US); Stuart D. Hellring, Pittsburgh, PA (US); Stephen G. McQuown, Cheswick, PA (US); Britt A. Minch, Tarentum, PA (US); Noel R. Vanier, Wexford, PA (US); W. David Polk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 613 days.

(21) Appl. No.: 12/607,681

(22) Filed: Oct. 28, 2009

(65) Prior Publication Data

US 2010/0047620 A1    Feb. 25, 2010

Related U.S. Application Data

(63) Continuation-in-part of application No. 12/054,821, filed on Mar. 25, 2008, now Pat. No. 8,129,466, which is a continuation-in-part of application No. 12/023,423, filed on Jan. 31, 2008.

(60) Provisional application No. 60/899,608, filed on Feb. 5, 2007, provisional application No. 61/026,267, filed on Feb. 5, 2008, provisional application No. 61/029,641, filed on Feb. 19, 2008.

(51) Int. Cl.
| | |
|---|---|
| C08L 53/00 | (2006.01) |
| C09D 5/33 | (2006.01) |
| B05D 7/00 | (2006.01) |
| C08F 293/00 | (2006.01) |
| C09D 7/02 | (2006.01) |
| C09D 7/12 | (2006.01) |
| C09D 17/00 | (2006.01) |
| C08K 3/00 | (2006.01) |
| C08K 5/00 | (2006.01) |

(52) U.S. Cl.
CPC ..... *C09D 5/004* (2013.01); *B05D 7/54* (2013.01); *C08F 293/00* (2013.01); *C08K 3/0033* (2013.01); *C08K 5/0041* (2013.01); *C08L 53/00* (2013.01); *C09D 7/02* (2013.01); *C09D 7/1233* (2013.01); *C09D 7/1266* (2013.01); *C09D 7/1291* (2013.01); *C09D 17/003* (2013.01)

(58) Field of Classification Search
CPC ..... C08K 3/0033; C08K 5/0041; C08L 53/00
USPC .......................................... 524/441, 500, 505
See application file for complete search history.

(56) References Cited

U.S. PATENT DOCUMENTS

| | | | |
|---|---|---|---|
| 2,294,875 A | 9/1942 | Hexter | |
| 4,311,623 A | 1/1982 | Supcoe | |
| 4,546,045 A | 10/1985 | Elias | |
| 4,656,226 A | 4/1987 | Hutchins et al. | |
| 5,319,001 A | 6/1994 | Morgan et al. | |
| 5,506,045 A | 4/1996 | Grochal | |
| 5,519,085 A * | 5/1996 | Ma et al. ....................... 524/503 |
| 5,540,998 A | 7/1996 | Yamada et al. | |
| 5,749,959 A | 5/1998 | Supcoe | |
| 5,939,182 A | 8/1999 | Huang et al. | |
| 5,962,143 A | 10/1999 | Krauthauser et al. | |
| 6,017,981 A | 1/2000 | Hugo | |
| 6,194,484 B1 | 2/2001 | Hugo | |
| 6,294,014 B1 | 9/2001 | Woodworth et al. | |
| 6,296,899 B1 | 10/2001 | Iizuka | |
| 6,306,209 B1 | 10/2001 | Woodworth et al. | |
| 6,336,966 B1 | 1/2002 | Coca et al. | |
| 6,365,666 B1 | 4/2002 | McCollum et al. | |
| 6,366,397 B1 | 4/2002 | Genjima et al. | |
| 6,376,597 B1 | 4/2002 | Coca et al. | |
| 6,399,228 B1 | 6/2002 | Simpson | |
| 6,441,066 B1 | 8/2002 | Woodworth et al. | |
| 6,462,125 B1 | 10/2002 | White et al. | |
| 6,521,038 B2 | 2/2003 | Yanagimoto et al. | |
| 6,590,049 B1 | 7/2003 | O'Dwyer et al. | |
| 6,623,556 B2 | 9/2003 | Zama | |
| 6,642,301 B2 | 11/2003 | White et al. | |
| 6,784,231 B2 | 8/2004 | Shimada et al. | |
| 6,875,800 B2 | 4/2005 | Vanier et al. | |
| 7,137,713 B2 | 11/2006 | Harasawa et al. | |
| 7,157,112 B2 | 1/2007 | Haines | |
| 7,211,324 B2 | 5/2007 | Kamimori | |
| 2001/0042492 A1 | 11/2001 | Greene et al. | |
| 2001/0044489 A1 | 11/2001 | Hugo | |
| 2002/0188051 A1 | 12/2002 | Hugo | |
| 2003/0030041 A1 | 2/2003 | Genjima et al. | |

(Continued)

FOREIGN PATENT DOCUMENTS

| | | |
|---|---|---|
| DE | 4035062 A1 | 5/1992 |
| DE | 4419748 C2 | 5/1999 |

(Continued)

OTHER PUBLICATIONS

StarMolecule, "Aluminum Powder Types", Mar. 2012.*
SciFinder—CAS Registry No. 5521-31-3.*
Spinelli, Harry J., Group transfer polymerization and its use in water based pigment dispersants and emulsion stabilizers, Progress in Organic Coatings 27, (1966), 255-260, Elsevier Science S.A.
Wake, L.V., The effect of pigments in formulating solar reflecting and infrared emitting coatings for military applications, (1990), 78-80, Horizons.
Military Specification, MIL-C-46127A(MR), (Apr. 26, 1977), Coating, Gray, Undercoat (Solar Heat Reflecting), 1-16.
Military Specification, MIL-E-46136A(MR), (Sep. 7, 1971), Enamel, Semi-Gloss, Alkyd, Solar Heat Reflecting, Olive Drab, 1-28.
Military Specification, MIL-E-46117(MR), (Dec. 29, 1967), Enamel, Alkyd, Lustreless, Solar Heat Reflecting, Olive Drab, 1-15.

(Continued)

*Primary Examiner* — Wenwen Cai
(74) *Attorney, Agent, or Firm* — Julie W. Meder

(57) ABSTRACT

Disclosed are infrared reflective coating compositions and cured coatings deposited on a substrate, as well as multi-component composite coating systems. The coating compositions include an infrared transparent pigment and an infrared reflective pigment.

16 Claims, No Drawings

(56) References Cited

U.S. PATENT DOCUMENTS

| | | |
|---|---|---|
| 2003/0110982 A1 | 6/2003 | Shimada et al. |
| 2004/0018360 A1 | 1/2004 | Hugo |
| 2004/0068046 A1 | 4/2004 | Hugo |
| 2004/0142205 A1 | 7/2004 | Chen et al. |
| 2004/0191540 A1 | 9/2004 | Jakobi et al. |
| 2004/0250731 A1* | 12/2004 | Nagano et al. ............... 106/404 |
| 2005/0129871 A1 | 6/2005 | Ruther et al. |
| 2005/0129964 A1 | 6/2005 | Hugo |
| 2005/0170171 A1 | 8/2005 | Vanier |
| 2005/0214483 A1* | 9/2005 | Fujieda et al. ................. 428/31 |
| 2005/0215685 A1 | 9/2005 | Haines |
| 2005/0287348 A1 | 12/2005 | Faler et al. |
| 2006/0229407 A1 | 10/2006 | Vogel et al. |
| 2006/0251895 A1 | 11/2006 | Lambert et al. |
| 2007/0087199 A1 | 4/2007 | Yoshimura et al. |
| 2008/0102270 A1 | 5/2008 | Shiao et al. |
| 2008/0188610 A1 | 8/2008 | Polk |

FOREIGN PATENT DOCUMENTS

| | | |
|---|---|---|
| DE | 10248234 B3 | 2/2004 |
| EP | 0218436 | 4/1987 |
| EP | 0361327 A1 | 4/1990 |
| EP | 0246342 B1 | 7/1991 |
| EP | 0965392 B1 | 12/1999 |
| EP | 1817383 B1 | 2/2009 |
| FR | 2538756 | 7/1984 |
| GB | 2420995 A | 6/2006 |
| GB | 2420995 A | 6/2006 |
| JP | 55074862 | 6/1980 |
| JP | 42-464478 | 9/1992 |
| JP | 2004-246478 | 9/1992 |
| JP | 4246478 A | 9/1992 |
| JP | 05293434 | 11/1993 |
| JP | 2000-279881 | 10/2000 |
| JP | 2001164138 A | 6/2001 |
| JP | 2001-240767 | 9/2001 |
| JP | 2002-060698 | 2/2002 |
| JP | 2002-201379 | 7/2002 |
| JP | 2002-355922 A | 12/2002 |
| JP | 2004-010778 | 1/2004 |
| JP | 2005-000821 | 1/2005 |
| JP | 2005-061042 | 3/2005 |
| JP | 2005-76019 A | 3/2005 |
| JP | 2005-153471 A | 6/2005 |
| JP | 2006-289247 | 10/2006 |
| JP | 2007-023064 | 1/2007 |
| JP | 2009-286862 A | 12/2009 |
| WO | WO 9618858 | 6/1996 |
| WO | WO 02/14445 A1 | 3/2001 |
| WO | 03095566 A1 | 11/2003 |
| WO | WO 2004/090030 A1 | 10/2004 |
| WO | 2005000914 A1 | 1/2005 |
| WO | 2005/019358 A1 | 3/2005 |
| WO | 2005095528 A2 | 10/2005 |
| WO | WO 2006/058782 A1 | 6/2006 |
| WO | 2009045981 A2 | 4/2009 |
| WO | 2009048515 A1 | 4/2009 |

OTHER PUBLICATIONS

Military Specification, MIL-E-46117A(MR), (Oct. 6, 1970), Enamel, Alkyd, Lustreless, Solar Heat Reflecting, Olive Drab, 1-25.

Military Specification, MIL-E-460968(MR), Amendment 1, (Dec. 8, 1969), Enamel, Lustreless, Quick Drying, Styrenated Alkyd Type, Solar Heat Reflecting, Olive Drab, 1-30.

Pickett, Charles F., Solar Heat Reflecting Coatings, Society of Automotive Engineers, International Automotive Engineering Congress, Detroit, Mich., (Jan. 13-17, 1969), 1-5.

Brady, Robert F. and Wake, Lindsay V., Principles and formulations for organic coatings with tailored infrared properties, Progress in Organic Coatings, 20, (1992), 1-25, Elsevier Sequoia.

* cited by examiner

SOLAR REFLECTIVE COATINGS AND COATING SYSTEMS

CROSS-REFERENCE TO RELATED APPLICATIONS

This application is a continuation-in-part of U.S. patent application Ser. No. 12/054,821, filed Mar. 25, 2008, which is a continuation-in-part of U.S. patent application Ser. No. 12/023,423 filed Jan. 31, 2008, which claims the benefit of U.S. Provisional Patent Application Ser. No. 60/899,608 filed Feb. 5, 2007, each of which being hereby incorporated by reference in their entireties. U.S. patent application Ser. No. 12/023,423 also claims the benefit of U.S. Provisional Patent Application Ser. Nos. 61/026,267, filed Feb. 5, 2008, and 61/029,641, filed Feb. 19, 2008, which are also incorporated by reference herein in their entireties.

FIELD OF THE INVENTION

The present invention relates generally to coating compositions and cured coatings deposited on a substrate, as well as multi-component composite coating systems. The cured coatings and multi-component composite coatings exhibit a desired color and are solar reflective.

BACKGROUND INFORMATION

For many coating applications such as automotive coatings, aerospace coatings, industrial coatings and architectural coatings, dark colors, such as black and dark blue are particularly desirable for aesthetic purposes. However, dark colored coatings have historically been susceptible to absorption of near-infrared radiation because they often rely on the use of pigments, such as carbon black, that absorb near-infrared radiation in addition to visible radiation. Near-infrared radiation, i.e., light energy having a wavelength of from 700 to 2500 nanometers, constitutes about 45% of the solar energy that reaches the earth's surface. Heat is a direct consequence of the absorption of near-infrared radiation. As a result, dark colored coatings have historically been susceptible to substantially increased temperatures, particularly on sunny days, which is often undesirable for many reasons. Thus, solar heat (near-infrared) reflecting coatings have been desired.

In *Principles and formulations for organic coatings with tailored infrared properties, Progress in Organic Coatings*, 20:1-25 (1992) ("Brady") formulation approaches for achieving solar heat reflecting coatings are described. In one approach, a two layer coating system is employed in which an upper layer is colored with pigments that absorb visible radiation but are transparent to near-infrared radiation, such as organic black pigments (perylene blacks are mentioned) or other organic pigments (phthalocyanine blues and greens and carbazole dioxazine violet are identified), and an underlayer, such as a highly reflective white undercoat, that reflects near-infrared radiation, reduces the temperature increase of the coating system. An example of such a coating system is also described in United States Patent Application Publication No. 2004/0191540 A1.

Brady mentions that this approach suffers from some drawbacks. First, according to Brady, the topcoat must be as thin as possible since it will always possess some level of near-infrared absorption. Second, Brady states that the topcoat must have a consistent film thickness for uniform visual appearance, which may not be easy. An additional disadvantage not mentioned by Brady is that the cost and, in some applications, such as aerospace and/or automotive applications, the weight, of a two-layer coating system can be undesirable.

In another approach mentioned by Brady, infrared reflective and infrared transparent pigments are blended in a single coating. A difficulty with this approach, however, has been the ability to match a desired color, particularly dark colors, while achieving improved infrared reflection performance. In other words, the addition of infrared reflective pigments, especially those that are not transparent in the visible wavelength range (from 400 to 700 nanometers), to a coating composition comprising infrared transparent pigments can cause an unacceptable change in the color of the resulting cured coating.

As a result, it would desirable to provide solar reflective coatings and coating systems while still achieving a color similar to a selected color of a coating that is significantly less solar reflective, include attractive dark, including black, colors. The inventions described herein were made in view of the foregoing desire.

SUMMARY OF THE INVENTION

In certain respects, the present invention is directed to coating compositions comprising: (a) a film-forming resin; (b) a colored and/or opaque infrared reflective pigment; and (c) an infrared transparent pigment. These coating compositions, when formed into a cured coating, exhibit: (1) a total solar reflectance of at least 15% as measured in accordance with ASTM E 903-96; and (2) an angle dependent color change of no more than 5 $\Delta E$ units when compared to the color of a control coating.

In other respects, the present invention is directed to coating compositions comprising: (a) a film-forming resin; (b) a thin flake metal or metal alloy infrared reflective pigment; (c) an infrared transparent pigment having a maximum haze of 10%; and (d) a polymeric pigment dispersant. The polymeric pigment dispersant may comprise a tri-block copolymer comprising: (i) a first segment comprising infrared transparent pigment affinic groups; (ii) a second segment comprising polar groups; and (iii) a third segment which is different from the first segment and the second segment.

In still other respects, the present invention is directed to coating compositions, suitable for use, for example, as an underlayer beneath another coating, comprising: (a) a film-forming resin, (b) an infrared reflective metal and/or metal alloy thin flake pigment; and (c) an infrared reflective inorganic oxide pigment, wherein the sum of (b) and (c) in the coating composition in no more than 10% by weight of the composition, based on the total solids weight of the composition.

In yet other respects, the present invention is directed to multi-component composite coatings comprising: (a) a first coating exhibiting a CIELAB L* value of no more than 50 and a total solar reflectance of at least 15% as measured in accordance with ASTM E 903-96 and deposited from a composition comprising: (i) a film-forming resin; (ii) an infrared reflective pigment; (iii) a infrared transparent pigment; and (iv) a pigment dispersant; and (b) a second coating deposited beneath at least a portion of the first coating, the second coating being deposited from a composition comprising: (i) a film-forming resin; (ii) an infrared reflective flake pigment; and (iii) an infrared reflective inorganic oxide pigment.

The present invention is also related to, inter alia, related methods for coating a substrate and coated substrates.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to coating compositions. In certain embodiments, the coating compositions comprise: (a) a film-forming resin; (b) an infrared reflective pigment; (c) an infrared transparent pigment; and (d) a polymeric pigment dispersant. In some embodiments, the polymeric pigment dispersant comprises a tri-block copolymer comprising: (i) a first segment comprising infrared transparent pigment affinic groups; (ii) a second segment comprising polar groups; and (iii) a third segment which is different from the first segment and the second segment.

As used herein, the term "film-forming resin" refers to resins that can form a self-supporting continuous film on at least a horizontal surface of a substrate upon removal of any diluents or carriers present in the composition or upon curing at ambient or elevated temperature.

Film-forming resins that may be used in the present invention include, without limitation, those used in automotive OEM coating compositions, automotive refinish coating compositions, industrial coating compositions, architectural coating compositions, coil coating compositions, packaging coating compositions, protective and marine coating compositions, and aerospace coating compositions, among others.

In certain embodiments, the film-forming resin included within the coating compositions described herein comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coating compositions described herein comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

The coating composition(s) described herein can comprise any of a variety of thermoplastic and/or thermosetting compositions known in the art. The coating composition(s) may be water-based or solvent-based liquid compositions, or, alternatively, in solid particulate form, i.e., a powder coating.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

In addition to or in lieu of the above-described crosslinking agents, the coating composition typically comprises at least one film-forming resin. Thermosetting or curable coating compositions typically comprise film forming polymers having functional groups that are reactive with the crosslinking agent. The film-forming resin in the coating compositions described herein may be selected from any of a variety of polymers well-known in the art. The film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof. Appropriate mixtures of film-forming resins may also be used in the preparation of the coating compositions described herein.

The coating compositions of the present invention also comprise an infrared reflective pigment. As used herein, the term "infrared reflective pigment" refers to a pigment that, when included in a coating composition, provides a cured coating with a reflectance of near-infrared radiation, which as used herein, refers to light energy having a wavelength of from 700 to 2500 nanometers, greater than a cured coating deposited in the same manner from the same composition but without the infrared reflective pigment. In some cases, the coating composition comprises the infrared reflective pigment in an amount sufficient to provide a cured coating that has a solar reflectance, measured according to ASTM E903-

96 in the wavelength range of 700 to 2500 nanometers, that is at least 10, or, in some cases, at least 15 percentage points higher than a coating deposited in the same manner from the same composition in which the infrared reflective pigment is not present.

The infrared reflective pigment can be colored or essentially colorless, translucent or opaque. As used herein, the term "essentially colorless" means that the pigment does not have a color, i.e., the absorption curve for the pigment is devoid of absorption peaks in the 400-700 nanometer range and does not present a tint or hue in reflected or transmitted light when viewed under sunlight. A colored infrared reflective pigment is an infrared reflective pigment that is not essentially colorless. Stated differently, a "colored" infrared reflective pigment is one that may be visibly absorbing, as defined below. A "translucent" pigment means that visible light is able to pass through the pigment diffusely. An "opaque" pigment is one that is not translucent. One example of an infrared reflective pigment that can be translucent and essentially colorless (if used in small enough amounts in a coating) is Solarflair 9870 pigment commercially available from Merck KGaA of Darmstadt, Germany. This commercially available pigment is also an example of an interference pigment (described below) that comprises a mica substrate that is coated with titanium dioxide.

One notable advantage of the coating compositions of certain embodiments of the present invention is that the inclusion of significant quantity of a colored and/or opaque infrared reflective pigment does not cause an unacceptable change in the color of the resulting cured coating as compared to a control coating (defined below). In other words, it is not necessary to use an essentially colorless and translucent infrared reflective pigment to achieve the desired result. As a result, significantly greater amounts of infrared reflective pigments may be used than would otherwise be possible and this is desirable to achieve desired solar reflectivity at a desired coating color.

Examples of suitable colored and/or opaque infrared-reflective pigments include, for example, any of a variety of metals and metal alloys, inorganic oxides, and interference pigments. Exemplary colors include, for example, white, as is the case with titanium dioxide; brown, as is the case with iron titanium brown spinel; green, as is the case with chromium oxide green; red, as is the case with iron oxide red; yellow, as is the case with chrome titanate yellow and nickel titanate yellow; blue and violet, as is the case with certain $TiO_2$ coated mica flakes.

Suitable metals and metal alloys include, for example, aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, as well as combinations thereof.

Often, such pigments are in the form of thin flakes. For example, "leafing" aluminum flakes are often suitable. As used herein, the term "thin flake" means that a particle has a ratio of its width to its thickness (termed aspect ratio) that is at least 2 and often falls in the range of 10 to 2,000, such as 3 to 400, or, in some cases, 10 to 200, including 10 to 150. As such, a "thin flake" particle is one that has a substantially flat structure. In some case, such flakes can have a coating deposited thereon, such as is the case with silica coated copper flakes.

In certain embodiments, such thin flake particles have a thickness of less than 0.05 microns to 10 microns, such as 0.5 to 5 microns. In certain embodiments, such thin flake particles have a maximum width of 10 to 150 microns, such as 10 to 30 microns.

In certain embodiments, the coating compositions of the present invention comprise thin flake particles comprising rounded edges and a smooth and flat surface, as opposed to jagged edges. Flakes having angular edges and uneven surfaces are known in the art as "cornflakes". On the other hand, flakes distinguished by more rounded edges, smoother, flatter surfaces are referred to as "silver dollar" flakes.

In fact, it was surprisingly discovered that the use of thin flake metal or metal alloys particles comprising rounded edges and a smooth and flat surface provided substantially improved solar reflectance results for a resulting coating, as opposed to the same coating in which "cornflakes" were used. This result was surprising because, as explained in U.S. Pat. No. 5,866,321, it is well known that "cornflake-shaped" flakes tend to refract more light and tend to orient more randomly in a coating layer as compared to "silver-dollar" type flakes. As a result, it would have been predicted that use of "cornflakes" would have been preferred for improved solar reflectance performance, but this is not what was observed.

Moreover, in certain embodiments, the thin flake metal or metal alloy particles comprising rounded edges have a maximum width of no more than 25 micron, such as 10 to 15 micron, when measured according to ISO 1524. In fact, it was surprisingly discovered that the use of such thin flake metal or metal alloys particles provided substantially improved solar reflectance results for a resulting coating, as opposed to the same coating in which larger such particles were used.

Additional suitable metal pigments include colored metallic pigments, such as those in which a coloring pigment is chemically adsorbed on the surface of a metallic pigment. Such colored metallic pigments are described in U.S. Pat. No. 5,037,745 at col. 2, line 55 to col. 7, line 54, the cited portion of which being incorporated herein by reference. Some such colored metallic pigments are also commercially available and include those available from U.S. Aluminum, Inc., Flemington, N.J., under the tradename FIREFLAKE. In certain embodiments, an infrared transparent pigment, such as the perylene-based pigments described below, can be chemically adsorbed on the surface of the metallic pigment, to provide a dark, sometimes black, colored infrared reflective metallic pigment.

Suitable inorganic oxide containing infrared reflective pigments include, for example, iron oxide, titanium oxide ($TiO_2$) pigment, composite oxide system pigments, titanium oxide-coated mica pigment, iron oxide-coated mica pigment, and zinc oxide pigment, among many others.

In certain embodiments, the infrared reflective pigment exhibits greater reflectivity in the near-infrared wavelength region (700 to 2500 nanometers) than it does in the visible region (400 to 700 nanometers). In certain embodiments, the ratio of reflectivity in the near-infrared region to the reflectivity in the visible region is greater than 1:1, such as at least 2:1, or, in some cases, at least 3:1. Certain interference pigments are examples of such infrared reflective pigments.

As used herein, the term "interference pigment" refers to a pigment having a multi-layer structure having alternating layers of material of different refractive index. Suitable light-interference pigments include, for example, pigments comprising a substrate of e.g. mica, $SiO_2$, $Al_2O_3$, $TiO_2$ or glass that is coated with one or more layers of e.g. titanium dioxide, iron oxide, titanium iron oxide or chrome oxide or combinations thereof, or pigments comprising combinations of metal and metal oxide, such as aluminum coated with layers of iron oxide layers and/or silicon dioxide.

In certain embodiments, the infrared reflective pigment is present in the foregoing coating compositions in an amount of at least 1% by weight, at least 2% by weight, at least 3% by weight, or, in some cases, at least 5% by weight, at least 6% by weight, or at least 10% by weight, based on the total solids weight of the coating composition. In certain embodiments, the infrared reflective pigment is present in the foregoing coating compositions in an amount of no more than 50% by weight, no more than 25% by weight, or, in some cases, no more than 15% by weight, based on the total solids weight of the coating composition Often, the infrared reflective pigment is present in the foregoing coating compositions in an amount greater than 5% by weight, based on the total weight of the coating composition, such as greater than 5% to 15% by weight, based on the total weight of the coating composition. As indicated, it was surprising to discover that colored and/or opaque infrared reflective pigments could be used in such amounts without causing an unacceptable change in the color of the resulting cured coating as compared to a control coating (defined below).

As indicated, certain coating compositions of the present invention also comprise an infrared transparent pigment, often a visibly absorbing infrared transparent pigment. Such pigments are a separate, and different, component of the coating composition from the previously described infrared reflective pigments. As used herein, the term "infrared transparent pigment" refers to a pigment that is substantially transparent in the near-infrared wavelength region (700 to 2500 nanometers), such as is described in United States Patent Application Publication No. 2004/0191540 at [0020]-[0026], the cited portion of which being incorporated herein by reference, without appreciable scattering or absorption of radiation in such wavelengths. In certain embodiments, the infrared transparent pigment has an average transmission of at least 70% in the near-infrared wavelength region. As used herein, the term "visible absorbing" refers to a pigment that substantially absorbs radiation in at least some wavelengths within the visible region of 400 to 700 nanometers. In some cases, a visible absorbing pigment used in the present coating compositions has at least about 70% (more preferably at least about 80%) of its total absorbance in the visible spectrum in the range of about 400 to about 500 nanometers. In some cases, the visible absorbing pigment has at least about 70% (more preferably at least about 75%) of its total absorbance in the visible spectrum in the range of about 500 to about 600 nanometers. In some cases, the visible absorbing pigment has at least about 60% (more preferably at least about 70%) of its total absorbance in the visible spectrum in the range of about 600 to about 700 nanometers.

Non-limiting examples of suitable infrared transparent pigments include, for example, copper phthalocyanine pigment, halogenated copper phthalocyanine pigment, anthraquinone pigment, quinacridone pigment, perylene pigment, monoazo pigment, disazo pigment, quinophthalone pigment, indanthrone pigment, dioxazine pigment, transparent iron oxide brown pigment, transparent iron oxide red pigment, transparent iron oxide yellow pigment, cadmium orange pigment, ultramarine blue pigment, cadmium yellow pigment, chrome yellow pigment, cobalt aluminate blue pigment, cobalt chromite blue pigment, iron titanium brown spinel pigment, manganese antimony titanium buff rutile pigment, zinc iron chromite brown spinel pigment, isoindoline pigment, diarylide yellow pigment, brominated anthranthron pigment and the like.

In certain embodiments, the infrared transparent pigment has a % of reflectance that increases at wavelengths of from 750 to 850 nanometers along the electromagnetic spectrum, such as is described in the aforementioned United States Patent Application Publication No. 2004/0191540. In some cases, the infrared transparent pigment has a % of reflectance that ranges from at least 10% at a wavelength of 750 nanometers along the electromagnetic spectrum to at least 90% at a wavelength of 900 nanometers.

In certain embodiments, particularly those in which it is desired that the coating deposited from the composition exhibit a dark color (CIELAB L* value of no more than 50, such as no more than 40, no more than 30, no more than 25, or, in some cases, no more than 20 or no more than 10, measured at an observation angle of 25°), the infrared transparent pigment comprises an infrared transparent black pigment, such as those that rely in part upon a perylene type structure, that is illustrated below:

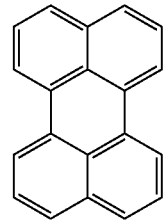 [SMILES: c1cc2cccc3c4cccc5cccc(c(c1)c23)c54]

Commercially available examples of such pigments include, Lumogen® black pigment from BASF Corporation, Southfield, Mich., Paliogen® Black L0086, from BASF, which has a Colour Index of "Pigment Black 32" (Part 1) and "71133" (Part 2), as well as Paliogen® Black S0084, which has Colour Index of "Pigment Black 31" (Part 1) and "71132" (Part 2). Further examples of infrared transparent black pigments that are suitable for use in certain embodiments of the present invention are described in United States Patent Application Publication No. 2009/0098476 A1 at [0030] to [0034], the cited portion of which being incorporated by reference herein, and include those having a perylene isoindolene structure, an azomethine structure, and/or an aniline structure.

In certain embodiments, it is desirable to employ an infrared transparent pigment that is both visible absorbing and which has low haze. As a result, in these embodiments, the composition comprises a substantially non-agglomerated infrared transparent and visible absorbing pigment having an average primary particle size of no more than 100 nanometers, such as no more than 50 nanometers or no more than 30 nanometers, such as is described in United States Patent Application Publication No. 2008-0187708 A1 at [0013] to [0022], the cited portion of which being incorporated herein by reference. Indeed, it has been discovered that the infrared reflectivity of a coating composition comprising an infrared reflective pigment, such as the thin flake metal and/or metal alloy infrared reflective pigments described above, can be substantially improved by the use of a visibly absorbing infrared transparent pigment having low haze, as compared to the same composition in which an infrared transparent and visible absorbing pigment that does not have low haze is used. It was surprising that the infrared reflectivity of a coating comprising infrared transparent pigments was observed to substantially improve by use of low haze infrared transparent pigments relative to compositions in which such pigments were not of low haze.

In certain embodiments, the infrared transparent pigments described above are added to the coating composition in the form of a tint. By tint, it is meant a composition of pigment in a polymeric pigment dispersant (such as is described below), which may be a resinous (polymeric) material compatible with solvent based and/or aqueous based coating compositions. In certain embodiments, such tints have a maximum haze of 10%, such as a maximum haze of 5% or a maximum haze of 1%, as described in U.S. Pat. No. 6,875,800 at col. 3, line 28 to col. 5, line 11, the cited portion of which being incorporated herein by reference. Haze is a measurement of the transparency of a material and is defined by ASTM D 1003. The haze values described herein are determined using an X-Rite 8400 spectrophotometer in transmittance mode with a 500 micron path-length cell on pigments dispersed in a suitable solvent such as n-butyl acetate. Because the percent haze of a liquid sample is concentration dependent (and therefore on the transmittance of light through the liquid), the percent haze is described herein at a transmittance of about 15% to about 20% (such as at 17.5%) at the wavelength of maximum absorbance.

The tints containing nano-sized pigments may be prepared by milling bulk organic pigments with milling media having a particle size of less than about 0.5 mm, such as less than 0.3 mm and, in some cases, about 0.1 mm or smaller. The tints containing pigment particles are milled to reduce the pigment primary particle size to nanoparticulate sizes in a high energy mill in an organic solvent system, such as butyl acetate using a pigment dispersant (such as is described below), with an optional polymeric grinding resin.

In certain embodiments, the total amount of infrared transparent pigment present in the foregoing coating compositions is at least 0.1% by weight, such as at least 1% by weight, at least 2% by weight, at least 3% by weight, or, in some cases at least 5% by weight or at least 100% by weight, based on the total solids weight of the coating composition. In certain embodiments, the infrared transparent pigment is present in the foregoing coating compositions in an amount of no more than 50% by weight, no more than 25% by weight, or, in some cases, no more than 15% by weight, based on the total solids weight of the coating composition.

Certain coating compositions of the present invention, therefore, comprise a polymeric pigment dispersant. In certain embodiments, such a dispersant comprises a tri-block copolymer comprising: (i) a first segment comprising infrared transparent pigment affinic groups, such as hydrophobic aromatic groups; (ii) a second segment comprising polar groups, such as hydroxyl groups, amine groups, ether groups, and/or acid groups; and (iii) a third segment which is different from the first segment and the second segment, such as a segment that is substantially non-polar, i.e., substantially free of polar groups and substantially free of infrared transparent pigment affinic groups. As used herein, term "substantially free" when used with reference to the absence of groups in a polymeric segment, means that no more than 5% by weight of the monomer used to form the third segment comprises polar groups or infrared transparent pigment affinic groups.

Suitable dispersants include acrylic copolymers produced from atom transfer radical polymerization. In certain embodiments, such copolymers have a weight average molecular weight of 1,000 to 20,000.

In certain embodiments, the polymeric pigment dispersant has a polymer chain structure represented by the following general formula (I), $$\Phi\text{-}(G)_p\text{-}(W)_q\text{—}(Y)_sT \qquad (I)$$

wherein G is a residue of at least one radically polymerizable ethylenically unsaturated monomer; W and Y are residues of at least one radically polymerizable ethylenically unsaturated monomer; with W and Y being different from one another; Φ is a hydrophobic residue of or derived from an initiator, and is free of the radically transferable group; T is or is derived from the radically transferable group of the initiator; p, q and s represent average numbers of residues occurring in a block of residues; p, q and s are each individually selected such that the pigment dispersant has a number average molecular weight of at least 250.

In certain embodiments, the coating compositions of the present invention are prepared from a pigment dispersion, i.e., tint, comprising: (a) an infrared transparent pigment, such as any of those described above; (b) a carrier that may be selected from water, at least one organic solvent and combinations thereof; and (c) a pigment dispersant, such as the copolymer described generally above.

The pigment dispersant described above may be described generally as having a head and tail structure, i.e., as having a polymeric head portion and a polymeric tail portion. The polymeric tail portion may have a hydrophilic portion and a hydrophobic portion, particularly at the terminus thereof. While not intending to be bound by any theory, it is believed that the polymeric head portion of the pigment dispersant is associated with the infrared transparent pigment, while the polymeric tail portion associates with the infrared reflective pigment in the coating composition. As used herein and in the claims, the terms hydrophobic and "hydrophilic" are relative to each other.

In certain embodiments, the pigment dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In certain embodiments, the initiation system comprises: a monomeric initiator having a single radically transferable atom or group; a transition metal compound, i.e., a catalyst, which participates in a reversible redox cycle with the initiator; and a ligand, which coordinates with the transition metal compound. The ATRP process is described in further detail in International Patent Publication No. WO 98/40415 and U.S. Pat. Nos. 5,807,937, 5,763,548 and 5,789,487.

Catalysts that may be used in the ATRP preparation of the pigment dispersant include any transition metal compound that can participate in a redox cycle with the initiator and the growing polymer chain. It may be preferred that the transition metal compound not form direct carbon-metal bonds with the polymer chain. Transition metal catalysts useful in the present invention may be represented by the following general formula (II), $$M^{n+}X_n \qquad (II)$$

wherein M is the transition metal, n is the formal charge on the transition metal having a value of from 0 to 7, and X is a counterion or covalently bonded component. Examples of the transition metal M include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$-$C_6$-alkoxy, cyano, cyanato, thiocyanato and azido. In one specific example, the transition metal is Cu(I) and X is halide, for example, chloride. Accordingly, one specific class of transition metal catalysts is the copper halides, for example, Cu(I) Cl. It may also be preferred that the transition metal catalyst contain a small amount, for example, 1 mole percent, of a redox conjugate, for example, $Cu(II)Cl_2$ when $Cu(I)Cl$ is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the pigment dispersant include, but are not limited to, compounds having one or more nitrogen, oxygen, phosphorus and/or sulfur atoms, which can coordinate to the transition metal catalyst compound, for example, through sigma and/or pi bonds. Classes of useful ligands include, but are not limited to, unsubstituted and substituted pyridines and bipyridines; porphyrins; cryptands; crown ethers; for example, 18-crown-6; polyamines, for example, ethylenediamine; glycols, for example, alkylene glycols, such as ethylene glycol; carbon monoxide; and coordinating monomers, for example, styrene, acrylonitrile and hydroxyalkyl (meth)acrylates. As used herein, the term "(meth)acrylate" and similar terms refer to acrylates, methacrylates and mixtures of acrylates and methacrylates. One specific class of ligands are the substituted bipyridines, for example, 4,4'-dialkyl-bipyridyls. Additional ligands that may be used in preparing pigment dispersant are described in U.S. Pat. No. 5,807,937 at column 18, line 57 through column 21, line 43.

Classes of monomeric initiators that may be used in the ATRP preparation of the pigment dispersant include, but are not limited to, aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having a radically transferable group, and preferably a single radically transferable group. The radically transferable group of the monomeric initiator may be selected from, for example, cyano, cyanato, thiocyanato, azido and halide groups. The monomeric initiator may also be substituted with functional groups, for example, oxyranyl groups, such as glycidyl groups. Additional useful initiators are described in U.S. Pat. No. 5,807,937 at column 17, line 4 through column 18, line 28.

In certain embodiments, the monomeric initiator is selected from 1-halo-2,3-epoxypropane, p-toluenesulfonyl halide, p-toluenesulfenyl halide, $C_6$-$C_{20}$-alkyl ester of alpha-halo-$C_2$-$C_6$-carboxylic acid, halomethylbenzene, (1-haloethyl)benzene, halomethylnaphthalene, halomethylanthracene and mixtures thereof. Examples of $C_2$-$C_6$-alkyl ester of alpha-halo-$C_2$-$C_6$-carboxylic acids include, hexyl alpha-bromopropionate, 2-ethylhexyl alpha-bromopropionate, 2-ethylhexyl alpha-bromohexionate and icosanyl alpha-bromopropionate. As used herein, the term "monomeric initiator" is meant to be distinguishable from polymeric initiators, such as polyethers, polyurethanes, polyesters and acrylic polymers having radically transferable groups.

In the ATRP preparation, the pigment dispersant, the amounts and relative proportions of monomeric initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the pigment dispersant can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5\times10^{-2}$:1.

In preparing the pigment dispersant by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The pigment dispersant may be prepared in the absence of solvent, i.e., by means of a bulk polymerization process. Often, the pigment dispersant is prepared in the presence of a solvent, typically water and/or an organic solvent. Classes of useful organic solvents include, but are not limited to, esters of carboxylic acids, ethers, cyclic ethers, $C_5$-$C_{10}$ alkanes, $C_5$-$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$-$C_4$ alkanes and fluorocarbons, may also be employed. One class of solvents is the aromatic hydrocarbon solvents, such as xylene, toluene, and mixed aromatic solvents such as those commercially available from Exxon Chemical America under the trademark SOLVESSO. Additional solvents are described in further detail in U.S. Pat. No. 5,807,937, at column 21, line 44 through column 22, line 54.

The ATRP preparation of the pigment dispersant is typically conducted at a reaction temperature within the range of 25° C. to 140° C., for example, from 50° C. to 100° C., and a pressure within the range of 1 to 100 atmospheres, usually at ambient pressure.

The ATRP transition metal catalyst and its associated ligand are typically separated or removed from the pigment dispersant prior to its use in the pigment dispersants of the present invention. Removal of the ATRP catalyst may be achieved using known methods, including, for example, adding a catalyst binding agent to the mixture of the pigment dispersant, solvent and catalyst, followed by filtering. Examples of suitable catalyst binding agents include, for example, alumina, silica, clay or a combination thereof. A mixture of the pigment dispersant, solvent and ATRP catalyst may be passed through a bed of catalyst binding agent. Alternatively, the ATRP catalyst may be oxidized in situ, the oxidized residue of the catalyst being retained in the pigment dispersant.

With reference to general formula (I), G may be a residue of at least one radically polymerizable ethylenically unsaturated monomer, such as a monomer selected from an oxirane functional monomer reacted with a carboxylic acid which may be an aromatic carboxylic acid or polycyclic aromatic carboxylic acid, including, for example, phenyl (meth)acrylate, p-nitrophenyl (meth)acrylate and benzyl (meth)acrylate; polycyclicaromatic (meth)acrylates, for example, 2-naphthyl (meth)acrylate; N-(aryl) maleimide; and mixtures thereof.

The oxirane functional monomer or its residue that is reacted with a carboxylic acid may be selected from, for example, glycidyl (meth)acrylate, 3,4-epoxycyclohexylmethyl(meth)acrylate, 2-(3,4-epoxycyclohexyl)ethyl(meth) acrylate, allyl glycidyl ether and mixtures thereof. Examples of carboxylic acids that may be reacted with the oxirane functional monomer or its residue include, but are not limited to, napthoic acid, hydroxy napthoic acids, para-nitrobenzoic acid and mixtures thereof.

With continued reference to general formula (I), W and Y may each be residues of monomers independently selected from, for example, (meth)acrylic acid, (meth)acrylates, and hydroxy-functional (meth)acrylates. Examples of $C_1$-$C_{20}$ alkyl (meth)acrylates (including linear or branched alkyls and cycloalkyls) of which W and Y may each independently be residues of, include, but are not limited to, methyl (meth)acrylate, ethyl (meth)acrylate, propyl (meth)acrylate, isopropyl (meth)acrylate, n-butyl (meth)acrylate, iso-butyl (meth) acrylate, tert-butyl (meth)acrylate, 2-ethylhexyl (meth) acrylate, lauryl (meth)acrylate, isobornyl (meth)acrylate, cyclohexyl (meth)acrylate, 3,3,5-trimethylcyclohexyl (meth) acrylate and isocane (meth)acrylate.

Hydroxy alkyl (meth)acrylates having from 2 to 4 carbon atoms in the alkyl group of which W and Y may each independently be residues of include, but are not limited to, hydroxyethyl (meth)acrylate, hydroxypropyl (meth)acrylate, hydroxybutyl (meth)acrylate, and butyl (meth)acrylate. In general formula (I), W and Y may each independently be residues of monomers having more than one (meth)acryloyl group, such as (meth)acrylic anhydride, diethyleneglycol bis (meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris (meth)acrylate and alkoxylated trimethylolpropane tris (meth)acrylate.

The numerals p, q and s represent the average total number of G, W and Y residues, respectively, occurring per block or segment of G residues (G-block or G-segment), W residues (W-block or W-segment) and Y residues (Y-block G or Y-segment), respectively. When containing more than one type or species of monomer residue, the W- and Y-blocks may each have at least one of random block (e.g., di-block and tri-block), alternating, and gradient architectures, Gradient architecture refers to a sequence of different monomer residues that change gradually in a systematic and predictable manner along the polymer backbone. For purposes of illustration, a W-block containing 6 residues of butyl methacrylate (BMA) and 6 residues of hydroxy propyl methacrylate (HPMA), for which q is 12, may have di-block, tetra-block, alternating and gradient architectures as described in U.S. Pat. No. 6,642,301, col. 10, lines 5-25. In certain embodiments, the G-block may include about 5-15 residues of glycidyl(meth)acrylate) reacted with an aromatic carboxylic acid (such as 3-hydroxy-2-napthoic acid), the W-block may be a random block of about 20-30 BMA and HPMA residues and the Y-block may be a uniform block of about 5-15 butyl acrylate (BA) residues.

The order in which monomer residues occur along the polymer backbone of the pigment dispersant is typically determined by the order in which the corresponding monomers are fed into the vessel in which the controlled radical polymerization is conducted. For example, the monomers that are incorporated as residues in the G-block of the pigment dispersant are generally fed into the reaction vessel prior to those monomers that are incorporated as residues in the W-block, followed by the residues of the Y-block.

During formation of the W- and Y-blocks, if more than one monomer is fed into the reaction vessel at a time, the relative reactivities of the monomers typically determines the order in which they are incorporated into the living polymer chain. Gradient sequences of monomer residues within the W- and Y-blocks can be prepared by controlled radical polymerization, and, in particular, by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937, at column 29, line 29 through column 31, line 35.

In certain embodiments, subscripts q and s each have a value of at least 1, such as at least 5 for general formula (I). Also, subscript s often has a value of less than 300, such as less than 100, or less than 50 (for example 20 or less) for general formula (I). The values of subscripts q and s may range between any combination of these values, inclusive of the recited values, for example, s may be a number from 1 to 100. Subscript p may have a value of at least 1, such as at least 5. Subscript p also often has a value of less than 300, such as less than 100 or less than 50 (e.g., 20 or less). The value of subscript p may range between any combination of these values, inclusive of the recited values, for example, p may be a number up to 50. The pigment dispersant often has a number average molecular weight (Mn) of from 250 to 40,000, for example, from 1000 to 30,000 or from 2000 to 20,000, as determined by gel permeation chromatography using polystyrene standards.

Symbol Φ of general formula (I) is, or is derived from, the residue of the initiator used in the preparation of the pigment dispersant by controlled radical polymerization, and is free of the radically transferable group of the initiator. For example, when the pigment dispersant is initiated in the presence of toluene sulfonyl chloride, the symbol Φ, more specifically Φ—is the residue,

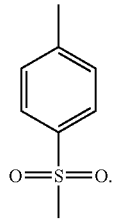

The symbol Φ may also represent a derivative of the residue of the initiator.

In general formula (I), T is or is derived from the radically transferable group of the ATRP initiator. The residue of the radically transferable group may be (a) left on the pigment dispersant, (b) removed or (c) chemically converted to another moiety. The radically transferable group may be removed by substitution with a nucleophilic compound, for example, an alkali metal alkoxylate. When the residue of the radically transferable group is, for example, a cyano group (—CN), it can be converted to an amide group or carboxylic acid group by methods known in the art.

The pigment dispersant is typically present in the pigment dispersion described above in an amount of at least 0.1 percent by weight, such as at least 0.5 percent by weight, or, in some cases, at least 1 percent by weight, based on the total weight of the pigment dispersion. The pigment dispersant is also often present in the pigment dispersion in an amount of less than 65 percent by weight, or less than 40 percent by weight, based on the total weight of the pigment dispersion. The amount of pigment dispersant present in the pigment dispersion may range between any combination of these values, inclusive of the recited values.

The infrared transparent pigment is often present in the pigment dispersion in an amount of at least 0.5 percent by weight, or at least 5 percent by weight, and/or at least 10 percent by weight, based on the total weight of the pigment dispersion. The infrared transparent pigment is also typically present in the pigment dispersion in an amount of less than 90 percent by weight, or less than 50 percent by weight, or less than 20 percent by weight, based on the total weight of the pigment dispersion. The amount of infrared transparent pigment present in the pigment dispersion may range between any combination of these values, inclusive of the recited values.

The infrared transparent pigment and pigment dispersant are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the infrared transparent pigment and pigment dispersant. The weight ratio of infrared transparent pigment to pigment dispersant is typically from 0.1:1 to 100:1, for example, from 0.2:1 to 5:1 or from 0.5:1 to 2:1.

The pigment dispersion often also comprises at least one organic solvent. Classes of organic solvents that may be present include, but are not limited to, xylene, toluene, alcohols, for example, methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, for example, acetone, methyl ethyl ketone, and diacetone alcohol; ethers, for example, dimethyl ether and methyl ethyl ether; cyclic ethers, for example, tetrahydrofuran and dioxane; esters, for example, ethyl acetate, ethyl lactate, ethylene carbonate and propylene carbonate; polyhydric alcohols, for example, ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, for example, butyl 2-hydroxyethyl ether, hexyl 2-hydroxyethyl ether, methyl 2-hydroxypropyl ether and phenyl 2-hydroxypropyl ether; nitrogen containing cyclic compounds, for example, pyrrolidone, N-methyl-2-pyrrolidone and 1,3-dimethyl-2-imidazolidinone; and sulfur containing compounds such as thioglycol, dimethyl sulfoxide and tetramethylene sulfone.

The pigment dispersion may be prepared by methods that are known to those of ordinary skill in the art. Such known methods typically involve the use of energy intensive mixing or grinding means, such as ball mills or media mills (e.g., sand mills), as described previously herein.

It has been discovered, surprisingly, that certain of the coating compositions described above that comprise: (a) a film-forming resin; (b) an infrared reflective pigment; (c) an infrared transparent pigment; and (d) a polymeric pigment dispersant comprising the aforedescribed a tri-block copolymer, are capable of producing coatings that reflect near-infrared radiation while exhibiting a color that closely matches the color of a control coating (as defined below), even when the infrared reflective pigment is such that it is an opaque and/or colored infrared reflective pigment. Such coatings may also have a dark color. The use of certain other pigment dispersants has not produced such results.

As a result, the present invention is directed to coating compositions comprising: (a) a film-forming resin; (b) a colored and/or opaque infrared reflective pigment; and (c) an infrared transparent pigment. These coating compositions, when formed into a cured coating, such as a cured coating having a dry film thickness of at least 2 mils, exhibit: (1) a total solar reflectance of at least 15%, such as at least 20% or at least 25%, as measured in accordance with ASTM E 903-96; and (2) an angle dependent color change of no more than 5 ΔE units, such as no more than 4 or no more than 3 ΔE units, when compared to the color of a control coating. In certain embodiments, such cured coatings further exhibit an angle dependent CIELAB L* value of no more than 50, such as no more than 40, no more than 30 or, in some cases, no more than 20 or no more than 10 when measured at an observation angle of 25°. As will be appreciated, in the CIELAB color-measuring system, the L* value is associated with a central vertical axis that represents lightness and darkness, the lightest (white) being L*=100 and the darkest (black) being L*=0. As used herein, "angle dependent CIELAB L* value" refers to the maximum L* value measured at any viewing angle from 110° to −15° using a multi-angle spectrophotometer, such as an MA68I Multi-angle spectrophotometer, commercially available from X-Rite Instruments, Inc.

As used herein, "angle dependent color change of no more than 5 ΔE units" means that the color difference of two coatings being compared does not exceed 5 ΔE units at any viewing angle when measured within the range of viewing angles from 110° to −15° using a multi-angle spectrophotometer, such as an MA68I Multi-angle spectrophotometer, commercially available from X-Rite Instruments, Inc.

As used herein, "a control coating" is a coating formed from a similar or identical composition but without inclusion of the colored and/or opaque infrared reflective pigment.

In certain embodiments of the present invention, the coating composition is substantially free, or, in some cases, completely free, of carbon black. As used herein, the term "substantially free" when used with reference to the amount of carbon black in a coating composition, means that carbon black is present in the composition in an amount of no more than 0.1 percent by weight, in some cases no more than 0.05 percent by weight, based on the total solids weight of the composition. As used herein, the term "completely free" when used with reference to the amount of carbon black in a coating composition, means that carbon black is not present in the composition at all.

If desired, the coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

The coating compositions described above are suitable for use in, for example, in multi-component composite coatings as discussed below, for example, as a primer coating or as a pigmented base coating composition in a color-plus-clear system, or as a monocoat topcoat. In certain embodiments, however, the foregoing coating compositions are used to form a topcoat in a multi-component composite coating that further comprises an infrared reflective coating layer deposited beneath at least a portion of the topcoat. As will be appreciated, various other coating layers may be present in accordance with certain embodiments of the present invention, such as, for example, a colorless clearcoat layer which may be deposited over at least a portion of the topcoat. In addition, one or more coating layers may be deposited between the topcoat and the infrared reflective coating layer deposited beneath the topcoat, such as, for example, a selectively strippable coating, as is sometimes used in, for example, aerospace applications. United States Patent Application Publication No. 2006/0106161A1, which is incorporated herein by reference, describes exemplary coatings of this type that comprise an amine-terminated polyamide having a number average molecular weight of from 500 Daltons to 100,000 Daltons. U.S. Pat. No. 6,899,924 at col. 2, line 10 to col. 4, line 65, the cited portion of which being incorporated herein by reference, also describes exemplary coatings of this type that comprise a non-volatile acidic aromatic polar organic compound in free acid or salt form. Moreover, in certain embodiments, one or more coating layers may be deposited between the substrate and the infrared reflective coating layer deposited beneath at least a portion of the topcoat, such as, for example, various corrosion resisting primer layers, including, without limitation, electrodeposited primer layers as are known in the art.

Indeed, it has been discovered that a topcoat deposited from a coating composition as described above can, in some cases, be used especially advantageously over another infrared reflective coating layer. In certain embodiments, such an infrared reflective undercoating layer is deposited from a coating composition comprising an infrared reflective pigment comprising inorganic oxide particles, such as any of those mentioned earlier, in combination with a thin flake metal and/or metal alloy pigment such as, for example, any of those mentioned above. More specifically, in certain embodiments, such an undercoating layer is deposited from a composition comprising: (a) a film-forming resin, (b) an infrared reflective metal and/or metal alloy thin flake pigment; and (c) an infrared reflective inorganic oxide pigment, wherein the sum of (b) and (c) in the coating composition in no more than 10% by weight of the composition, based on the total solids weight of the composition.

As used herein, the term "infrared reflective coating layer" refers to a coating that exhibits a total solar reflectance (TSR) of at least 15%, such as at least 20%, or, in some cases, at least 30%, at least 50%, or in certain cases at least 60% when measured according to ASTM E 903-96 or ASTM E 1918 using an integrating sphere spectrophotometer.

The substrate upon which the coatings described above may be deposited may take numerous forms and be produced from a variety of materials. In certain embodiments, the substrate takes the form of (i) an automobile component, such as an interior or exterior metal panel, leather or fabric seating areas, plastic components, such as dashboards or steering wheels, and/or other interior vehicle surfaces; (ii) an aerospace component, such as an aircraft exterior panel (which may be metal, such as aluminum or an aluminum alloy, or produced from a polymeric composite material, for example), leather, plastic or fabric seating areas and interior panels, including control panels and the like; (iii) a building component, such as exterior panels and roofing materials; and (iv) industrial components, among others.

Suitable substrate materials include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding. Suitable metallic substrate materials include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics,

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminum derivatives, quebracho, chestnut or mimosa extracts, aromatic syntans, polyurethanes, (co) polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam, EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The coating compositions from which each of the coatings described above is deposited can be applied to a substrate by any of a variety of methods including dipping or immersion, spraying, intermittent spraying, dipping followed by spraying, spraying followed by dipping, brushing, or roll-coating, among other methods. In certain embodiments, however, the coating compositions are applied by spraying and, accordingly, such compositions often have a viscosity that is suitable for application by spraying at ambient conditions.

After application of a coating composition to the substrate, it is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. A method of forming a coating film according to the present invention, therefore, comprises applying a coating composition to the surface of a substrate or article to be coated, coalescing the coating composition to form a substantially continuous film and then curing the thus-obtained coating. In certain embodiments, the curing of these coatings can comprise a flash at ambient or elevated temperatures followed by a thermal bake. In some embodiments, curing can occur at ambient temperature of 20° C. to 175° C., for example.

As will also be appreciated from the foregoing description, the present invention is also directed to multi-component composite coatings comprising: (a) a first coating exhibiting a CIELAB L* value of no more than 50 and a total solar reflectance of at least 15% as measured in accordance with ASTM E 903-96 and deposited from a composition comprising: (i) a film-forming resin; (ii) an infrared reflective pigment; (iii) a dark infrared transparent pigment; and (iv) a pigment dispersant; and (b) a second coating deposited beneath at least a portion of the first coating, the second coating being deposited from a composition comprising: (i) a film-forming resin; (ii) an infrared reflective flake pigment; and (iii) an infrared reflective inorganic oxide pigment, wherein the sum of (ii) and (iii) in the composition is less than 10% by weight, based on the total solids weight of the composition.

Illustrating the invention are the following examples that are not to be considered as limiting the invention to their details. All parts and percentages in the examples, as well as throughout the specification, are by weight unless otherwise indicated.

Examples 1-6

Coating compositions were prepared using the ingredients and amounts listed in Table 1. A premixture of components 4 and 5 was added to a premixture of the other components just prior to application. Amounts are in grams.

TABLE 1

| Component | Description | Ex. 1 | Ex. 2 | Ex. 3 | Ex. 4 | Ex. 5 | Ex. 6 |
|---|---|---|---|---|---|---|---|
| 1 | Blue Reflective Pigment[1] | — | 0.62 | 0.62 | 0.62 | 0.62 | 0.62 |
| 2a | Infrared Transparent Pigment Concentrate[2] | 3.38 | 3.83 | — | — | — | — |
| 2b | Infrared Transparent Pigment Concentrate[3] | — | — | 3.53 | — | — | — |
| 2c | Infrared Transparent Pigment Concentrate[4] | — | — | — | 3.33 | — | — |
| 2d | Infrared Transparent Pigment Concentrate[5] | — | — | — | — | 2.55 | — |
| 2e | Infrared Transparent Pigment Concentrate[6] | — | — | — | — | — | 3.03 |
| 3 | Polyol Solution[7] | 3.35 | 3.35 | 3.35 | 3.35 | 3.35 | 3.35 |
| 4 | Isocyanate Solution[8] | 2.66 | 2.66 | 2.66 | 2.66 | 2.66 | 2.66 |
| 5 | Catalyst Solution[9] | 0.99 | 0.99 | 0.99 | 0.99 | 0.99 | 0.99 |

[1] Xymara Dual Pearl D21 commercially available from Ciba. This is a TiO₂ coated mica flake.
[2] 0.14 parts by weight of a polymeric pigment dispersant prepared in a manner consistent with Synthesis Example A of U.S. patent application Ser. No. 12/054,821, 0.079 parts by weight of DOWANOL ® PM Acetate (commercially available from Dow Chemical Company), and 0.16 parts by weight PALIOGEN ® Black L0086 pigment (commercially available from BASF Corporation) were added to a container and mixed with a Cowles blade for 10 minutes. This premix was then placed in an Eiger ® mill with a 70% load of 1.2-1.7 mm Zirconox grind media (a ceramic milling media available commercially from Jyoti Ceramic Industries Pvt. Ltd.). The mill was operated at 1500 rpm and recirculated for 135 minutes until a Hegman of 7.5 was achieved.
[3] 0.29 parts by weight of a polymeric pigment dispersant Disperbyk 2001 ®, 0.47 parts by weight of DOWANOL ® PM Acetate (commercially available from Dow Chemical Company), and 0.24 parts by weight PALIOGEN ® Black L0086 pigment (commercially available from BASF Corporation) were added to a container and mixed at 2000 rpm with a Premier Mill Lab Disperator ® fitted with a Norblade polyethylene impeller. To this premix was added a 47% 0.7-1.2 mm Zirconox grind media (a ceramic milling media available commercially from Jyoti Ceramic Industries Pvt. Ltd.). The mill operation was continued at 2000 revolutions per minute for 11 hours.
[4] 0.36 parts by weight of a polymeric pigment dispersant Disperbyk 170 ®, 0.43 parts by weight of DOWANOL ® PM Acetate (commercially available from Dow Chemical Company), and 0.21 parts by weight PALIOGEN ® Black L0086 pigment (commercially available from BASF Corporation) were added to a container and mixed at 2000 rpm with a Premier Mill Lab Disperator ® fitted with a Norblade polyethylene impeller. To this premix was added a 43% 0.7-1.2 mm Zirconox grind media (a ceramic milling media available commercially from Jyoti Ceramic Industries Pvt. Ltd.). The mill operation was continued at 2000 revolutions per minute for 11 hours.
[5] 0.30 parts by weight of a polymeric pigment dispersant Disperbyk 162 ®, 0.46 parts by weight of DOWANOL ® PM Acetate (commercially available from Dow Chemical Company), and 0.23 parts by weight PALIOGEN ® Black L0086 pigment (commercially available from BASF Corporation) were added to a container and mixed at 2000 rpm with a Premier Mill Lab Disperator ® fitted with a Norblade polyethylene impeller. To this premix was added a 46% 0.7-1.2 mm Zirconox grind media (a ceramic milling media available commercially from Jyoti Ceramic Industries Pvt. Ltd.). The mill operation was continued at 2000 revolutions per minute for 11 hours.
[6] 0.30 parts by weight of a polymeric pigment dispersant Disperbyk 2000 ®, 0.46 parts by weight of DOWANOL ® PM Acetate (commercially available from Dow Chemical Company), and 0.23 parts by weight PALIOGEN ® Black L0086 pigment (commercially available from BASF Corporation) were added to a container and mixed with a Norblade polyethylene impeller at 2000 rpm. To this premix was added a 46% 0.7-1.2 mm Zirconox grind media (a ceramic milling media available commercially from Jyoti Ceramic Industries Pvt. Ltd.). The mill operation was continued at 2000 revolutions per minute for 11 hours.
[7] Commercially available as Desothane ®HS Clear Topcoat CA8000/B900A from PRC-DeSoto International, Inc.
[8] Commercially available as Desothane Activator CA8000B commercially available from PRC-DeSoto International, Inc.
[9] Commercially available as Desothane CA 8000C from PRC-DeSoto International, Inc.

The coating compositions were applied as a draw down over a black and white brushout drawdown card commercially available from Byk-Gardner under catalog number PA-2857. The coatings were cured at ambient conditions. Dry film thicknesses for each cured coating are reporting in Table 2. The coatings were analyzed for total solar reflectance and color. Results are reported in Table 2.

TABLE 2

| Test | Example 1 | Example 2 | Example 3 | Example 4 | Example 5 | Example 6 |
|---|---|---|---|---|---|---|
| Average Dry Film Thickness[1] | 2.33 | 2.66 | 3.01 | 2.62 | 2.66 | 3.05 |
| Solar Reflectance[2] | | | | | | |
| White Portion of Card | 44.1 | 43.3 | 43.5 | 43.8 | 45.5 | 44.4 |
| Black Portion of Card | 12.7 | 25.9 | 29.6 | 27.1 | 28.7 | 28.4 |
| Estimated Total Solar Reflectance | 10.0 | 24.8 | 28.8 | 26.1 | 28.1 | 27.5 |
| Estimated Solar Reflectance in Near-IR Range | 8.0 | 22.6 | 26.3 | 23.7 | 25.7 | 24.9 |
| Angle Dependent Color Over Black[3] | | | | | | |
| Observation angle: −15° | L = 10.79<br>$a^* = -0.46$<br>$b^* = -2.04$ | L = 15.59<br>$a^* = -0.93$<br>$b^* = -2.84$ | L = 25.92<br>$a^* = -2.53$<br>$b^* = -20.10$ | L = 18.10<br>$a^* = -2.05$<br>$b^* = -14.09$ | L = 20.88<br>$a^* = -2.20$<br>$b^* = -15.92$ | L = 37.22<br>$a^* = -1.63$<br>$b^* = -12.81$ |
| Observation angle: 15° | L = 8.60<br>$a^* = -0.40$<br>$b^* = -1.40$ | L = 11.66<br>$a^* = -0.96$<br>$b^* = -2.41$ | L = 23.98<br>$a^* = -5.48$<br>$b^* = -18.62$ | L = 16.86<br>$a^* = -4.05$<br>$b^* = -12.64$ | L = 18.74<br>$a^* = -4.32$<br>$b^* = -14.16$ | L = 29.84<br>$a^* = -3.49$<br>$b^* = -13.11$ |
| Observation angle: 25° | L = 6.10<br>$a^*, -0.27$<br>$b^* = -0.65$ | L = 7.37<br>$a^* = -0.86$<br>$b^* = -1.65$ | L = 17.58<br>$a^* = -5.89$<br>$b^* = -13.75$ | L = 13.26<br>$a^* = -4.18$<br>$b^* = -9.83$ | L = 14.02<br>$a^* = -4.44$<br>$b^* = -11.06$ | L = 17.86<br>$a^* = -4.74$<br>$b^* = -11.83$ |
| Observation angle: 45° | L = 5.58<br>$a^* = 0.06$<br>$b^* = -0.33$ | L = 5.96<br>$a^* = -0.19$<br>$b^* = -0.74$ | L = 11.21<br>$a^* = -3.89$<br>$b^* = -6.89$ | L = 9.51<br>$a^* = -2.73$<br>$b^* = -4.88$ | L = 9.64<br>$a^* = -2.66$<br>$b^* = -5.68$ | L = 11.03<br>$a^* = -3.39$<br>$b^* = -6.57$ |
| Observation angle: 75° | L = 5.81<br>$a^* = -0.30$<br>$b^* = -0.58$ | L = 5.96<br>$a^* = -0.38$<br>$b^* = -0.67$ | L = 8.46<br>$a^* = -2.27$<br>$b^* = -3.42$ | L = 7.78<br>$a^* = -1.59$<br>$b^* = -2.53$ | L = 7.83<br>$a^* = -1.63$<br>$b^* = -2.79$ | L = 8.52<br>$a^* = -2.10$<br>$b^* = -3.33$ |
| Observation angle: 110° | L = 5.36<br>$a^* = -0.26$<br>$b^* = -0.49$ | L = 5.44<br>$a^* = -0.23$<br>$b^* = -0.53$ | L = 6.88<br>$a^* = -1.28$<br>$b^* = -2.00$ | L = 6.43<br>$a^* = -0.75$<br>$b^* = -1.46$ | L = 6.52<br>$a^* = -0.76$<br>$b^* = -1.56$ | L = 7.00<br>$a^* = -1.20$<br>$b^* = -1.92$ |
| Angle Dependent Color Over White[3] | | | | | | |
| Observation angle: −15° | L = 12.88<br>$a^* = -0.28$<br>$b^* = -2.06$ | L = 15.28<br>$a^* = -0.37$<br>$b^* = -3.20$ | L = 34.85<br>$a^* = -2.48$<br>$b^* = -18.30$ | L = 27.26<br>$a^* = -1.84$<br>$b^* = -12.70$ | L = 29.89<br>$a^* = -1.79$<br>$b^* = -13.05$ | L = 38.40<br>$a^* = -1.52$<br>$b^* = -12.88$ |
| Observation angle: 15° | L = 9.98<br>$a^* = -0.06$<br>$b^* = -1.24$ | L = 11.52<br>$a^* = -0.12$<br>$b^* = -2.45$ | L = 30.15<br>$a^* = -4.67$<br>$b^* = -16.92$ | L = 22.81<br>$a^* = -3.32$<br>$b^* = -12.16$ | L = 25.43<br>$a^* = -3.35$<br>$b^* = -12.67$ | L = 31.84<br>$a^* = -3.27$<br>$b^* = -12.97$ |
| Observation angle: 25° | L = 6.79<br>$a^* = 0.04$<br>$b^* = -0.57$ | L = 7.36<br>$a^* = -0.16$<br>$b^* = -1.29$ | L = 20.40<br>$a^* = -5.17$<br>$b^* = -12.73$ | L = 15.60<br>$a^* = -3.55$<br>$b^* = -9.23$ | L = 17.26<br>$a^* = -4.04$<br>$b^* = -9.71$ | L = 19.42<br>$a^* = -4.57$<br>$b^* = -11.42$ |
| Observation angle: 45° | L = 6.30<br>$a^* = 0.54$<br>$b^* = -0.27$ | L = 6.21<br>$a^* = 0.38$<br>$b^* = -0.37$ | L = 11.83<br>$a^* = -3.56$<br>$b^* = -6.50$ | L = 9.79<br>$a^* = -1.92$<br>$b^* = -4.38$ | L = 10.87<br>$a^* = -2.79$<br>$b^* = -5.10$ | L = 11.62<br>$a^* = -3.39$<br>$b^* = -6.18$ |
| Observation angle: 75° | L = 6.45<br>$a^* = 0.10$<br>$b^* = -0.49$ | L = 6.15<br>$a^* = 0.03$<br>$b^* = -0.48$ | L = 8.57<br>$a^* = -2.08$<br>$b^* = -3.19$ | L = 7.79<br>$a^* = -1.06$<br>$b^* = -2.21$ | L = 8.24<br>$a^* = -1.56$<br>$b^* = -2.47$ | L = 8.65<br>$a^* = -1.95$<br>$b^* = -2.93$ |
| Observation angle: 110° | L = 6.10<br>$a^* = -0.01$<br>$b^* = -0.36$ | L = 5.59<br>$a^* = -0.04$<br>$b^* = -0.38$ | L = 6.91<br>$a^* = -1.11$<br>$b^* = -1.81$ | L = 6.56<br>$a^* = -0.48$<br>$b^* = -1.23$ | L = 6.79<br>$a^* = -0.73$<br>$b^* = -1.43$ | L = 7.11<br>$a^* = -1.07$<br>$b^* = -1.80$ |
| ΔE Over Black vs. White | | | | | | |
| Observation angle: −15° | 2.09 | 0.74 | 9.10 | 9.26 | 9.47 | 1.19 |
| Observation angle: 15° | 1.43 | 0.85 | 6.45 | 6.02 | 6.91 | 2.02 |
| Observation angle: 25° | 0.75 | 0.79 | 3.09 | 2.50 | 3.54 | 1.62 |
| Observation angle: 45° | 0.86 | 0.72 | 0.80 | 0.99 | 1.36 | 0.70 |
| Observation angle: 75° | 0.76 | 0.48 | 0.32 | 0.62 | 0.53 | 0.44 |
| Observation angle: 110° | 0.79 | 0.29 | 0.25 | 0.37 | 0.30 | 0.21 |
| ΔE Over Black Relative to Example 1 | | | | | | |
| Observation angle: −15° | n/a | 4.88 | 23.65 | 14.18 | 17.24 | 28.56 |
| Observation angle: 15° | n/a | 3.27 | 20.85 | 9.41 | 2.44 | 11.17 |
| Observation angle: 25° | n/a | 1.72 | 18.30 | 12.28 | 13.73 | 16.83 |
| Observation angle: 45° | n/a | 0.61 | 9.50 | 6.63 | 7.24 | 8.97 |
| Observation angle: 75° | n/a | 0.19 | 4.36 | 3.05 | 3.28 | 4.26 |
| Observation angle: 110° | n/a | 0.09 | 2.37 | 1.53 | 1.66 | 2.38 |

[1]Coating thickness (mils) was measured and recorded using a PosiTector 6000 Coating Thickness Gage (DeFelsko).
[2]Solar reflectance values were calculated according to ASTM E903-96.
[3]Color measurements were made using a BYK-MAC 6-angle instrument, available from Byk-Gardner.

Examples 7-9

Coating compositions were prepared using the ingredients and amounts listed in Table 3. A premixture of components 4 and 5 was added to a premixture of the other components just prior to application. Amounts are in grams.

TABLE 3

| Component | Ingredient | Example 7 | Example 8 | Example 9 |
|---|---|---|---|---|
| 1 | Blue Reflective Pigment[1] | 0.59 | — | 0.62 |
| 2 | Infrared Transparent Pigment Concentrate[2] | — | 3.86 | 3.83 |
| 3 | Polyol Solution[3] | 3.83 | 3.83 | 3.35 |
| 4 | Isocyanate Solution[4] | 3.04 | 3.04 | 2.60 |
| 5 | Catalyst Solution[5] | 1.13 | 1.13 | 0.99 |

[1]SunMICA ® Iridescent Blue commercially available from Sun Chemical. This is a TiO$_2$ coated mica flake.

TABLE 3-continued

| Component | Ingredient | Example 7 | Example 8 | Example 9 |
|---|---|---|---|---|

[2]0.18 parts by weight of a polymeric pigment dispersant prepared in a manner consistent with Synthesis Example A of U.S. patent application Ser. No. 12/054,821, 0.86 parts by weight of DOWANOL ® PM Acetate (commercially available from Dow Chemical Company), and 0.21 parts by weight PALIOGEN ® Black L0086 pigment (commercially available from BASF Corporation) were added to a container and mixed with a Cowles blade for 15 minutes. This premix was then placed in a mini-basket mill with a 60% load of 1.2-1.7 mm Zirconox grind media (a ceramic milling media available commercially from Jyoti Ceramic Industries Pvt. Ltd.). The mill was operated at 2000-3000 feet per minute and recirculated for 282 minutes until a Hegman of 8.0 was achieved. The resulting dispersion had a haze value of 19.04%
[3]Commercially available as Desothane ® HS Clear Topcoat CA8000/B900A from PRC-DeSoto International, Inc.
[4]Commercially available as Desothane Activator CA8000B commercially available from PRC-DeSoto International, Inc.
[5]Commercially available as Desothane CA 8000C from PRC-DeSoto International, Inc.

Each of the coating compositions of Example 7-9 were applied as a draw down over a black and white brushout drawdown card commercially available from Byk-Gardner under catalog number PA-2857. The coatings were cured at ambient conditions. Dry film thicknesses for each cured coating are reporting in Table 4. The coatings were analyzed for total solar reflectance and color. Results are reported in Table 4.

TABLE 4

| Test | Example | Example 8 | Example 9 |
|---|---|---|---|
| Average Dry Film Thickness (mils)[1] | 2.42 | 2.04 | 1.56 |
| Solar Reflectance[2] | | | |
| White Portion of Card | 84.2 | 49.9 | 45.0 |
| Black Portion of Card | 25.9 | 11.3 | 20.1 |
| Estimated Total Solar Reflectance | 22.1 | 7.8 | 18.3 |
| Estimated Solar Reflectance in Near-Infrared Range | 14.5 | 5.7 | 16.2 |
| Angle Dependent Color Over Black (L, a*, b*)[3] | | | |
| Observation angle: −15° | 56.30, −2.85, −35.35 | 12.80, −0.53, −2.80 | 13.10, −0.74, −1.95 |
| Observation angle: 15° | 57.34, −9.85, −34.83 | 10.78, −0.52, −2.66 | 9.59, −0.99, −1.71 |
| Observation angle: 25° | 54.26, −10.48, −33.67 | 7.40, −0.54, −1.57 | 6.90, −0.83, −1.02 |
| Observation angle: 45° | 46.63, −8.83, −30.17 | 5.64, −0.14, −0.54 | 5.80, −0.21, −0.45 |
| Observation angle: 75° | 40.57, −4.38, −27.73 | 5.72, −0.45, −0.48 | 5.90, −0.50, −0.53 |
| Observation angle: 110° | 35.87, −0.57, −25.15 | 5.37, −0.49, −0.39 | 5.40, −0.49, −0.43 |
| Angle Dependent Color Over White (L, a*, b*)[3] | | | |
| Observation angle: −15° | 94.63, −2.09, −1.67 | 14.20, −0.46, −2.73 | 12.07, −0.46, −1.56 |
| Observation angle: 15° | 96.32, −3.52, −2.02 | 11.45, −0.26, −2.41 | 9.28, −0.76, −1.47 |
| Observation angle: 25° | 94.55, −2.93, −0.07 | 7.50, −0.22, −1.17 | 6.88, −0.67, −0.89 |
| Observation angle: 45° | 92.08, −1.20, 4.89 | 6.07, 0.41, −0.32 | 6.20, 0.18, −0.36 |
| Observation angle: 75° | 90.53, −0.17, 8.82 | 6.06, 0.01, −0.37 | 6.23, −0.12, −0.44 |
| Observation angle: 110° | 87.05, −0.57, 10.37 | 5.62, −0.13, −0.30 | 5.66, −0.23, −0.35 |
| ΔE Over Black vs. White | | | |
| Observation angle: −15° | 51.03 | 1.40 | 1.13 |
| Observation angle: 15° | 51.35 | 0.76 | 0.46 |
| Observation angle: 25° | 53.00 | 0.53 | 0.21 |
| Observation angle: 45° | 57.91 | 0.73 | 0.56 |
| Observation angle: 75° | 62.05 | 0.59 | 0.52 |
| Observation angle: 110° | 62.30 | 0.45 | 0.37 |
| ΔE Over Black Relative to Example 7 | | | |
| Observation angle: −15° | n/a | n/a | 0.92 |
| Observation angle: 15° | n/a | n/a | 1.59 |
| Observation angle: 25° | n/a | n/a | 0.80 |
| Observation angle: 45° | n/a | n/a | 0.20 |
| Observation angle: 75° | n/a | n/a | 0.19 |
| Observation angle: 110° | n/a | n/a | 0.05 |

[1]Coating thickness was measured and recorded using a PosiTector 6000 Coating Thickness Gage (DeFelsko).
[2]Solar reflectance values were calculated according to ASTM E903-96.
[3]Color measurements were made using a BYK-MAC 6-angle instrument, available from Byk-Gardner.

Examples 10-12

Coating compositions were prepared using the ingredients and amounts listed in Table 5. A premixture of components 4 and 5 was added to a premixture of the other coating components just prior to application. Amounts are in grams.

TABLE 5

| Component | Ingredient | Example 10 | Example 11 | Example 12 |
|---|---|---|---|---|
| 1 | Blue Reflective Pigment[1] | 2.06 | — | 3.04 |
| 2 | Infrared Transparent Pigment Concentrate[2] | — | 3.86 | 4.50 |
| 3 | Polyol Solution[3] | 3.83 | 3.83 | 3.83 |
| 4 | Isocyanate Solution[4] | 3.04 | 3.04 | 3.04 |
| 5 | Catalyst Solution[5] | 1.13 | 1.13 | 1.13 |

[1]FireFlake ® D462 BL commercially available from Showa. This is a blue pigmented polymer coating aluminum flake.

TABLE 5-continued

| Component | Ingredient | Example 10 | Example 11 | Example 12 |
|---|---|---|---|---|

[2]0.18 parts by weight of a polymeric pigment dispersant prepared as described in Synthesis Example A of U.S. patent application Ser. No. 12/054,821, 0.86 parts by weight of DOWANOL ® PM Acetate (commercially available from Dow Chemical Company), and 0.21 parts by weight PALIOGEN ® Black L0086 pigment (commercially available from BASF Corporation) were added to a container and mixed with a Cowles blade for 15 minutes. This premix was then placed in a mini-basket mill with a 60% load of 1.2-1.7 mm Zirconox grind media (a ceramic milling media available commercially from Jyoti Ceramic Industries Pvt. Ltd.). The mill was operated at 2000-3000 feet per minute and recirculated for 282 minutes until a Hegman of 8.0 was achieved. The resulting dispersion had a haze value of 19.04%
[3]Commercially available as Desothane ® HS Clear Topcoat CA8000/B900A from PRC-DeSoto International, Inc.
[4]Commercially available as Desothane Activator CA8000B commercially available from PRC-DeSoto International, Inc.
[5]Commercially available as Desothane CA 8000C from PRC-DeSoto International, Inc.

Each of the coating compositions of Example 10-12 were applied as a draw down over a black and white brushout drawdown card commercially available from Byk-Gardner under catalog number PA-2857. The coatings were cured at ambient conditions. Dry film thicknesses for each cured coating are reporting in Table 6. The coatings were analyzed total solar reflectance and color. Results are reported in Table 6.

TABLE 6

| Test | Example 10 | Example 11 | Example 12 |
|---|---|---|---|
| Average Dry Film Thickness (mils)[1] | 2.15 | 1.89 | 1.79 |
| Solar Reflectance[2] | | | |
| White Portion of Card | 28.0 | 52.0 | 26.6 |
| Black Portion of Card | 25.2 | 11.1 | 25.1 |
| Estimated Total Solar Reflectance | 25.0 | 6.5 | 25.0 |
| Estimated Solar Reflectance in Near-Infrared Range | 19.8 | 5.1 | 22.9 |
| Angle Dependent Color Over Black (L, a*, b*)[3] | | | |
| Observation angle: −15° | 39.06, −18.42, −37.85 | 13.21, −0.55, −2.42 | 16.68, −0.93, −3.14 |
| Observation angle: 15° | 35.67, −18.93, −36.83 | 9.90, −0.50, −1.97 | 12.68, −0.82, −2.45 |
| Observation angle: 25° | 33.68, −18.53, −36.73 | 7.10, −0.49, −1.23 | 7.51, −0.94, −1.77 |
| Observation angle: 45° | 29.11, −15.98, −34.34 | 5.53, −0.12, −0.49 | 5.32, −0.58, −0.80 |
| Observation angle: 75° | 25.33, −12.28, −33.04 | 5.58, −0.45, −0.52 | 5.34, −0.71, −0.78 |
| Observation angle: 110° | 20.03, −8.78, −30.11 | 5.20, −0.45, −0.44 | 4.92, −0.61, −0.70 |
| Angle Dependent Color Over White (L, a*, b*)[3] | | | |
| Observation angle: −15° | 38.88, −20.39, −39.46 | 15.93, −0.45, −3.45 | 16.81, −1.01, −2.17 |
| Observation angle: 15° | 38.07, −20.72, −38.79 | 11.81, −0.29, −2.84 | 12.62, −1.23, −1.91 |
| Observation angle: 25° | 35.44, −19.54, −37.94 | 8.06, −0.21, −1.60 | 7.74, −1.57, −1.67 |
| Observation angle: 45° | 31.23, −16.91, −35.35 | 6.37, 0.41, −0.38 | 5.62, −0.97, −0.96 |
| Observation angle: 75° | 27.77, −13.12, −33.72 | 6.12, 0.03, −0.36 | 5.53, −0.99, −0.93 |
| Observation angle: 110° | 22.85, −10.13, −31.13 | 5.69, −0.10, −0.30 | 5.17, −0.76, −0.80 |
| ΔE Over Black vs. White | | | |
| Observation angle: −15° | 2.56 | 2.91 | 0.98 |
| Observation angle: 15° | 3.57 | 2.11 | 0.68 |
| Observation angle: 25° | 2.37 | 1.07 | 0.68 |
| Observation angle: 45° | 2.54 | 1.00 | 0.51 |
| Observation angle: 75° | 2.67 | 0.74 | 0.37 |
| Observation angle: 110° | 3.29 | 0.62 | 0.31 |
| ΔE Over Black Relative to Example 10 | | | |
| Observation angle: −15° | n/a | n/a | 3.56 |
| Observation angle: 15° | n/a | n/a | 2.84 |
| Observation angle: 25° | n/a | n/a | 0.81 |
| Observation angle: 45° | n/a | n/a | 0.59 |
| Observation angle: 75° | n/a | n/a | 0.45 |
| Observation angle: 110° | n/a | n/a | 0.41 |

[1]Coating thickness was measured and recorded using a PosiTector 6000 Coating Thickness Gage (DeFelsko).
[2]Solar reflectance values were calculated according to ASTM E903-96.
[3]Color measurements were made using a BYK-MAC 6-angle instrument, available from Byk-Gardner.

Example 13-15

Coating compositions were prepared using the ingredients and amounts listed in Table 7. A premixture of components 4 and 5 was added to a premixture of the other coating components just prior to application. Amounts are in grams.

TABLE 7

| Component | Ingredient | Example 13 | Example 14 | Example 15 |
|---|---|---|---|---|
| 1 | Violet Reflective Pigment[1] | 0.59 | — | 0.62 |
| 2 | Infrared Transparent Pigment Concentrate[2] | — | 3.86 | 3.83 |
| 3 | Polyol Solution[3] | 3.83 | 3.83 | 3.35 |
| 4 | Isocyanate Solution[4] | 3.04 | 3.04 | 2.60 |
| 5 | Catalyst Solution[5] | 1.13 | 1.13 | 0.99 |

[1]SolarFlair ® 9870 commercially available from EMD Chemicals. It is TiO$_2$ coated mica flake.
[2]0.18 parts by weight of a polymeric pigment dispersant prepared in a manner consistent with Synthesis Example A of U.S. patent application Ser. No. 12/054,821, 0.86 parts by weight of DOWANOL ® PM Acetate (commercially available from Dow Chemical Company), and 0.21 parts by weight PALIOGEN ® Black L0086 pigment (commercially available from BASF Corporation) were added to a container and mixed with a Cowles blade for 15 minutes. This premix was then placed in a mini-basket mill with a 60% load of 1.2-1.7 mm Zirconox grind media (a ceramic milling media available commercially from Jyoti Ceramic Industries Pvt. Ltd.). The mill was operated at 2000-3000 feet per minute and recirculated for 282 minutes until a Hegman of 8.0 was achieved. The resulting dispersion had a haze value of 19.04%
[3]Commercially available as Desothane ® HS Clear Topcoat CA8000/B900A from PRC-DeSoto International, Inc.
[4]Commercially available as Desothane Activator CA8000B commercially available from PRC-DeSoto International, Inc.
[5]Commercially available as Desothane CA 8000C from PRC-DeSoto International, Inc.

Each of the coating compositions of Example 13-15 were applied as a draw down over a black and white brushout drawdown card commercially available from Byk-Gardner under catalog number PA-2857. The coatings were cured at ambient conditions. Dry film thicknesses for each cured coating are reporting in Table 8. The coatings were analyzed for total solar reflectance and color. Results are reported in Table 8.

TABLE 8

| Test | Example 13 | Example 14 | Example 15 |
|---|---|---|---|
| Average Dry Film Thickness (mils)[1] | 2.35 | 1.80 | 1.40 |
| Solar Reflectance[2] | | | |
| White Portion of Card | 84.1 | 52.0 | 44.8 |
| Black Portion of Card | 27.2 | 9.5 | 18.9 |
| Estimated Total Solar Reflectance | 23.3 | 5.5 | 16.7 |
| Estimated Solar Reflectance in Near-Infrared Range | 17.3 | 4.1 | 14.6 |
| Angle Dependent Color Over Black (L, a*, b*)[3] | | | |
| Observation angle: −15° | 62.50, 15.35, 5.71 | 19.07, −0.56, −2.84 | 14.45, −0.30, −1.50 |
| Observation angle: 15° | 53.45, 7.32, 0.73 | 10.69, −0.47, −1.84 | 10.55, −0.29, −1.42 |
| Observation angle: 25° | 47.97, 5.59, −0.50 | 7.45, −0.54, −1.25 | 7.49, −0.34, −1.12 |
| Observation angle: 45° | 38.16, 4.24, −1.35 | 5.70, −0.19, −0.45 | 6.02, −0.02, −0.41 |
| Observation angle: 75° | 34.60, 4.84, −1.37 | 5.80, −0.53, −0.50 | 6.09, −0.39, −0.45 |
| Observation angle: 110° | 33.42, 4.93, −0.08 | 5.22, −0.48, −0.37 | 5.59, −0.44, −0.38 |
| Angle Dependent Color Over White (L, a*, b*)[3] | | | |
| Observation angle: −15° | 98.12, 4.61, 8.97 | 13.35, −0.20, −2.73 | 17.61, −0.42, −2.51 |
| Observation angle: 15° | 96.70, 0.32, 7.23 | 10.99, −0.10, −2.36 | 13.00, −0.18, −2.00 |
| Observation angle: 25° | 94.27, −0.73, 7.23 | 7.61, −0.19, −1.50 | 8.48, −0.14, −1.11 |
| Observation angle: 45° | 91.67, −1.53, 7.66 | 6.23, 0.46, −0.43 | 6.48, 0.40, −0.30 |
| Observation angle: 75° | 91.11, −2.10, 7.77 | 6.12, −0.03, −0.36 | 6.31, −0.05, −0.35 |
| Observation angle: 110° | 88.53, −2.85, 7.51 | 5.61, −0.14, −0.29 | 5.75, −0.12, −0.32 |
| ΔE Over Black vs. White | | | |
| Observation angle: −15° | 37.35 | 5.73 | 3.32 |
| Observation angle: 15° | 44.29 | 0.71 | 2.51 |
| Observation angle: 25° | 47.37 | 0.46 | 1.01 |
| Observation angle: 45° | 54.57 | 0.84 | 0.63 |
| Observation angle: 75° | 57.66 | 0.61 | 0.41 |
| Observation angle: 110° | 56.18 | 0.53 | 0.35 |
| ΔE Over Black Relative to Example 13 | | | |
| Observation angle: −15° | n/a | n/a | 4.82 |
| Observation angle: 15° | n/a | n/a | 0.48 |
| Observation angle: 25° | n/a | n/a | 0.24 |
| Observation angle: 45° | n/a | n/a | 0.37 |
| Observation angle: 75° | n/a | n/a | 0.33 |
| Observation angle: 110° | n/a | n/a | 0.37 |

[1]Coating thickness was measured and recorded using a PosiTector 6000 Coating Thickness Gage (DeFelsko).
[2]Solar reflectance values were calculated according to ASTM E903-96.
[3]Color measurements were made using a BYK-MAC 6-angle instrument, available from Byk-Gardner.

Examples 16-18

Coating compositions were prepared using the ingredients and amounts listed in Table 9. A premixture of components 4 and 5 was added to a premixture of the other coating components just prior to application. Amounts are in grams.

TABLE 9

| Component | Ingredient | Example 1 | Example 2 | Example 3 |
|---|---|---|---|---|
| 1 | Bule Reflective Pigment[1] | 0.59 | — | 0.62 |
| 2 | Infrared Transparent Pigment Concentrate[2] | — | 3.83 | 3.83 |
| 3 | Polyol Solution[3] | 3.83 | 3.04 | 3.35 |
| 4 | Isocyanate Solution[4] | 3.04 | 1.13 | 2.60 |
| 5 | Catalyst Solution[5] | 1.13 | 3.86 | 0.99 |

[1]Xymara ® Dual Pearl D21 commercially available from Ciba. This is a TiO$_2$ coated mica flake.
[2]0.18 parts by weight of a polymeric pigment dispersant prepared in a manner consistent with Synthesis Example A of U.S. patent application Ser. No. 12/054, 821, 0.86 parts by weight of DOWANOL ® PM Acetate (commercially available from Dow Chemical Company), and 0.21 parts by weight PALIOGEN ® Black L0086 pigment (commercially available from BASF Corporation) were added to a container and mixed with a Cowles blade for 15 minutes. This premix was then placed in a mini-basket mill with a 60% load of 1.2-1.7 mm Zirconox grind media (a ceramic milling media available commercially from Jyoti Ceramic Industries Pvt. Ltd.). The mill was operated at 2000-3000 feet per minute and recirculated for 282 minutes until a Hegman of 8.0 was achieved. The resulting dispersion had a haze value of 19.04%

[3]Commercially available as Desothane ® HS Clear Topcoat CA8000/B900A from PRC-DeSoto International, Inc.
[4]Commercially available as Desothane Activator CA8000B commercially available from PRC-DeSoto International, Inc.
[5]Commercially available as Desothane CA 8000C from PRC-DeSoto International, Inc.

Each of the coating compositions of Examples 16-18 were applied as a draw down over a black and white brushout drawdown card commercially available from Byk-Gardner under catalog number PA-2857. The coatings were cured at ambient conditions. Dry film thicknesses for each cured coating are reporting in Table 10. The coatings were analyzed for total solar reflectance and color, Results are reported in Table 10.

TABLE 10

| Test | Example 16 | Example 17 | Example 18 |
|---|---|---|---|
| Average Dry Film Thickness (mils)[1] | 2.17 | 2.00 | 1.38 |
| Solar Reflectance[2] | | | |
| White Portion of Card | 84.5 | 51.7 | 45.3 |
| Black Portion of Card | 28.3 | 9.7 | 22.2 |
| Estimated Total Solar Reflectance | 24.7 | 5.8 | 20.5 |
| Estimated Solar Reflectance in Near-Infrared Range | 16.7 | 4.4 | 18.4 |
| Angle Dependent Color Over Black (L, a*, b*)[3] | | | |
| Observation angle: −15° | 55.00, −0.87, −31.81 | 18.90, −0.63, −2.79 | 14.11, −0.89, −2.78 |
| Observation angle: 15° | 54.83, −6.68, −32.31 | 14.09, −0.55, −2.32 | 11.52, −1.44, −2.70 |
| Observation angle: 25° | 52.48, −7.95, −31.33 | 8.46, −0.49, −1.39 | 8.19, −1.45, −1.81 |
| Observation angle: 45° | 47.89, −8.17, −29.35 | 5.97, −0.14, −0.52 | 6.34, −0.51, −0.69 |
| Observation angle: 75° | 43.59, −5.53, −27.53 | 5.78, −0.48, −0.50 | 6.17, −0.60, −0.58 |
| Observation angle: 110° | 38.98, −2.04, −24.64 | 5.54, −0.48, −0.47 | 5.65, −0.56, −0.46 |
| Angle Dependent Color Over White (L, a*, b*)[3] | | | |
| Observation angle: −15° | 95.72, −1.09, 0.78 | 18.46, −0.57, −3.89 | 16.94, −0.78, −3.08 |
| Observation angle: 15° | 95.36, −2.07, 1.20 | 15.25, −0.40, −3.27 | 12.99, −1.09, −2.57 |
| Observation angle: 25° | 93.99, −1.93, 2.61 | 8.72, −0.22, −1.51 | 9.08, −1.17, −1.73 |
| Observation angle: 45° | 92.24, −0.98, 5.61 | 6.20, 0.43, −0.37 | 6.73, −0.09, −0.58 |
| Observation angle: 75° | 90.88, −0.46, 7.89 | 5.93, 0.06, −0.37 | 6.35, −0.29, −0.46 |
| Observation angle: 110° | 86.30, −0.73, 8.82 | 5.48, −0.10, −0.31 | 5.67, −0.28, −0.36 |
| ΔE Over Black vs. White | | | |
| Observation angle: −15° | 52.16 | 1.18 | 2.85 |
| Observation angle: 15° | 52.79 | 1.51 | 1.51 |
| Observation angle: 25° | 53.96 | 0.40 | 0.93 |
| Observation angle: 45° | 56.94 | 0.63 | 0.59 |
| Observation angle: 75° | 59.31 | 0.58 | 0.38 |
| Observation angle: 110° | 57.97 | 0.41 | 0.30 |
| ΔE Over Black Relative to Example 16 | | | |
| Observation angle: −15° | n/a | n/a | 4.80 |
| Observation angle: 15° | n/a | n/a | 2.74 |
| Observation angle: 25° | n/a | n/a | 1.08 |
| Observation angle: 45° | n/a | n/a | 0.55 |
| Observation angle: 75° | n/a | n/a | 0.42 |
| Observation angle: 110° | n/a | n/a | 0.14 |

[1]Coating thickness was measured and recorded using a PosiTector 6000 Coating Thickness Gage (DeFelsko).
[2]Solar reflectance values were calculated according to ASTM E903-96.
[3]Color measurements were made using a BYK-MAC 6-angle instrument, available from Byk-Gardner.

Example 19-30

Coating compositions were prepared using the ingredients and amounts listed in Table 11. A premixture of components 4 and 5 was added to a premixture of the other coating components just prior to application. Amounts are in grams.

TABLE 11

| Component | Description | Ex. 19 | Ex. 20 | Ex. 21 | Ex. 22 | Ex. 23 | Ex. 24 |
|---|---|---|---|---|---|---|---|
| 1a | Aluminum Flake Slurry[1] | 0.50 | 0.41 | 0.50 | 0.41 | — | — |
| 1b | Aluminum Flake Slurry[1a] | — | — | — | — | 0.47 | 0.39 |
| 2a | Infrared Transparent Pigment Concentrate[2] | 6.23 | — | — | — | 6.23 | — |
| 2b | Infrared Transparent Pigment Concentrate[3] | — | 1.84 | — | — | — | 2.47 |
| 2c | Infrared Transparent Pigment Concentrate[4] | — | — | 5.49 | — | — | — |
| 2d | Infrared Transparent Pigment Concentrate[5] | — | — | — | 1.99 | — | — |
| 3 | Polyol Solution[6] | 2.87 | 2.87 | 2.87 | 2.87 | 2.87 | 2.87 |
| 4 | Isocyanate Solution[7] | 2.28 | 2.28 | 2.28 | 2.28 | 2.28 | 2.28 |
| 5 | Catalyst Solution[8] | 0.85 | 0.85 | 0.85 | 0.85 | 0.85 | 0.85 |

| Component | Description | Ex. 25 | Ex. 26 | Ex. 27 | Ex. 28 | Ex. 29 | Ex. 30 |
|---|---|---|---|---|---|---|---|
| 1a | Aluminum Flake Slurry[1] | — | — | — | — | — | — |
| 1b | Aluminum Flake Slurry[1a] | 0.47 | 0.39 | — | — | — | — |
| 1b | Aluminum Flake Slurry[1b] | — | — | 0.57 | 0.47 | 0.57 | 0.47 |
| 2a | Infrared Transparent Pigment Concentrate[2] | — | — | 6.23 | — | — | — |
| 2b | Infrared Transparent Pigment Concentrate[3] | — | — | — | 2.47 | — | — |
| 2c | Infrared Transparent Pigment Concentrate[4] | 5.49 | — | — | — | 5.49 | — |
| 2d | Infrared Transparent Pigment Concentrate[5] | — | 1.99 | — | — | — | 1.99 |
| 3 | Polyol Solution[6] | 2.87 | 2.87 | 2.87 | 2.87 | 2.87 | 2.87 |
| 4 | Isocyanate Solution[7] | 2.28 | 2.28 | 2.28 | 2.28 | 2.28 | 2.28 |
| 5 | Catalyst Solution[8] | 0.85 | 0.85 | 0.85 | 0.85 | 0.85 | 0.85 |

[1] To 50 parts of butyl acetate solvent in a glass container was added 50 parts of Sparkle Silver ® Premier 751 (commercially available from Silberline Manufacturing Company, Incorporated). This slurry was hand shaken, and then sonicated in an ultrasonic bath for 30 minutes.

[1a] To 50 parts of butyl acetate solvent in a glass container was added 50 parts of STAPA ® IL Hydrolan 2156 (commercially available from Eckart America, LP). This slurry was hand shaken, and then sonicated in an ultrasonic bath for 30 minutes.

[1b] To 50 parts of butyl acetate solvent in a glass container was added 50 parts of STAPA ® Metallux 3580 (commercially available from Eckart America, LP). This slurry was hand shaken, and then sonicated in an ultrasonic bath for 30 minutes.

[2] 3.00 parts by weight of a polymeric pigment dispersant prepared in a manner consistent with Synthesis Example A of U.S. patent application Ser. No. 12/054,821, 5.08 parts by weight of DOWANOL ® PM Acetate (commercially available from Dow Chemical Company), and 0.86 parts by weight PALIOGEN ® Black L0086 pigment (commercially available from BASF Corporation) were added to a container and mixed with a Cowles blade for 15 minutes. This premix was then placed in a mini-basket mill for predispersion until a Hegman of 7.5 was achieved. This predispersion was then placed in an Eiger ® mill with a 75% load of 0.3 mm YTZ grind media (a ceramic milling media available commercially from Tosah Corporation). The mill was operated at 4000 fpm and recirculated for 1020 minutes. The resulting dispersion had a haze of 4.80%.

[3] 31.6 parts by weight of a polymeric pigment dispersant prepared in a manner consistent with Synthesis Example A of U.S. patent application Ser. No. 12/054,821, 32.4 parts by weight of DOWANOL ® PM Acetate (commercially available from Dow Chemical Company), and 36 parts by weight PALIOGEN ® Black L0086 pigment (commercially available from BASF Corporation) were added to a container while agitating. This premix was then added to a "Red Head" ™ laboratory grinding mill model L-2 (commercially available from CB Mills division of Chicago Boiler Company) loaded with 0.7 to 1.2 mm Zirconox ® grind media (a ceramic milling media available commercially from Jyoti Ceramic Industries Pvt. Ltd.). An additional 33 parts by weight of DOWANOL ® PM Acetate was added to reduce viscosity. This mixture was recycled in multiple passes through the mill until a Hegman of 8 was achieved. The resulting dispersion is believed to have had a haze of greater than 10%.

[4] 3.00 parts by weight of a polymeric pigment dispersant prepared in a manner consistent with Synthesis Example A of U.S. patent application Ser. No. 12/054,821, 4.7 parts by weight of DOWANOL ® PM Acetate (commercially available from Dow Chemical Company), and 0.86 parts by weight Lumogen ® Black FK4280 pigment (commercially available from BASF Corporation) were added to a container and mixed with a Cowles blade for 15 minutes. This premix was then placed in a mini-basket mill for predispersion until a Hegman of 6.0 was achieved. This predispersion was then placed in an Eiger ® mill with a 75% load of 0.3 mm YTZ grind media (a ceramic milling media available commercially from Tosah Corporation). The mill was operated at 4000 fpm and recirculated for 570 minutes. The resulting dispersion had a haze of 1.39%.

[5] 31.6 parts by weight of a polymeric pigment dispersant prepared in a manner consistent with Synthesis Example A of U.S. patent application Ser. No. 12/054,821, 32.4 parts by weight of DOWANOL ® PM Acetate (commercially available from Dow Chemical Company), and 36 parts by weight Lumogen ® Black FK4280 pigment (commercially available from BASF Corporation) were added to a container while agitating. This premix was then added to a "Red Head" ™ laboratory grinding mill model L-2 (commercially available from CB Mills division of Chicago Boiler Company) loaded with 0.7 to 1.2 mm Zirconox ® grind media (a ceramic milling media available commercially from Jyoti Ceramic Industries Pvt. Ltd. Corporation). An additional 83 parts by weight of DOWANOL ® PM Acetate was added to reduce viscosity. This mixture was recycled in multiple passes through the mill until a Hegman of 8 was achieved. The resulting dispersion is believed to have had a haze of greater than 10%.

[6] Commercially available as Desothane ® HS Clear Topcoat CA8000/B900A from PRC-DeSoto International, Inc.

[7] Commercially available as Desothane Activator CA8000B commercially available from PRC-DeSoto International, Inc.

[8] Commercially available as Desothane CA 8000C from PRC-DeSoto International, Inc.

Each of the coating compositions of Examples 19-30 were applied as a draw down over a black and white brushout drawdown card commercially available from Byk-Gardner under catalog number PA-2857. The coatings were cured at ambient conditions. Dry film thicknesses for each cured coating are reporting in Table 12. The coatings were analyzed for total solar reflectance. Results are reported in Table 12.

TABLE 12

| Test | Ex. 19 | Ex. 20 | Ex. 21 | Ex. 22 | Ex. 23 | Ex. 24 |
|---|---|---|---|---|---|---|
| Average Dry Film Thickness[1] | 1.18 | 1.77 | 1.60 | 1.52 | 1.60 | 1.59 |
| Solar Reflectance[2] | | | | | | |
| White Portion of Card | 36.7 | 26.3 | 30.8 | 25.4 | 38.0 | 32.4 |
| Black Portion of Card | 35.9 | 25.7 | 30.2 | 23.4 | 35.3 | 28.1 |
| Estimated Total Solar Reflectance | 35.8 | 25.5 | 30.1 | 23.2 | 35.2 | 27.8 |
| Estimated Solar Reflectance in Near-IR Range | 32.0 | 22.7 | 27.5 | 20.5 | 32.0 | 25.4 |
| Test | Ex. 25 | Ex. 26 | Ex. 27 | Ex. 28 | Ex. 29 | Ex. 30 |
| Average Dry Film Thickness[1] | 1.27 | 1.16 | 1.10 | 1.28 | 1.35 | 1.76 |
| Solar Reflectance[2] | | | | | | |
| White Portion of Card | 32.6 | 31.4 | 38.2 | 31.3 | 33.6 | 31.9 |
| Black Portion of Card | 28.6 | 28.8 | 38.5 | 29.3 | 32.8 | 31.4 |
| Estimated Total Solar Reflectance | 28.3 | 28.7 | 38.1 | 29.1 | 32.8 | 31.3 |
| Estimated Solar Reflectance in Near-IR Range | 26.1 | 25.9 | 34.3 | 26.1 | 30.1 | 28.0 |

[1]Coating thickness (mils) was measured and recorded using a PosiTector 6000 Coating Thickness Gage (DeFelsko).
[2]Solar reflectance values were calculated according to ASTM E903-96.

Examples 31-34

Coating compositions were prepared using the ingredients and amounts listed in Table 13. A premixture of components 1 and 2 was added to component 3 just prior to application. Amounts are in grams.

TABLE 13

| Component | Description | Ex. 31 | Ex. 32 | Ex. 33 | Ex. 34 |
|---|---|---|---|---|---|
| 1 | Aluminum Flake Slurry[1] | — | 0.64 | 1.30 | 1.99 |
| 2 | Base Resin[2] | 12.23 | 12.23 | 12.23 | 12.23 |
| 3 | Activator[3] | 7.77 | 7.77 | 7.77 | 7.77 |

[1]To 50 parts of butyl acetate solvent in a glass container was added 50 parts of STAPA ® Metallux 3580 (commercially available from Eckart America, LP). This slurry was hand shaken, and then sonicated in an Ultrasonic bath for 30 minutes.
[2]Desoprime ™ HS Primer CA7501A commercially available from PPG Industries, Inc., Pittsburgh, PA. A chromate-free epoxy primer containing titanium dioxide (1-5% by weight, based on total composition).
[3]Desoprime ™ HS Primer CA7501B commercially available from PPG Industries, Inc., Pittsburgh, PA.

Each of the coating compositions of Examples 31-34 were applied as a draw down over a black and white brushout drawdown card commercially available from Byk-Gardner under catalog number PA-2857. The coatings were cured at ambient conditions, Dry film thicknesses for each cured coating are reporting in Table 14. The coatings were analyzed for total solar reflectance. Results are reported in Table 14.

TABLE 14

| Test | Ex. 31 | Ex. 32 | Ex. 33 | Ex. 34 |
|---|---|---|---|---|
| Average Dry Film Thickness[1] | 2.42 | 2.09 | 1.93 | 1.86 |
| Solar Reflectance[2] | | | | |
| White Portion of Card | 40.4 | 36.3 | 32.9 | 33.7 |
| Black Portion of Card | 28.6 | 31.1 | 31.5 | 32.6 |
| Estimated Total Solar Reflectance | 27.6 | 30.7 | 31.3 | 32.5 |
| Estimated Solar Reflectance in Near-IR Range | 13.2 | 16.9 | 18.3 | 19.2 |

[1]Coating thickness (mils) was measured and recorded using a PosiTector 6000 Coating Thickness Gage (DeFelsko).
[2]Solar reflectance values were calculated according to ASTM E903-96.

Examples 35-38

Coating compositions were prepared using the ingredients and amounts listed in Table 15. A premixture of components 4 and 5 was added to the other components just prior to application. Amounts are in grams.

TABLE 15

| Component | Description | Ex. 35 | Ex. 36 | Ex. 37 | Ex. 38 |
|---|---|---|---|---|---|
| 1a | Violet Reflective Pigment[1] | — | 2.20 | — | — |
| 1b | Blue Reflective Pigment[1a] | — | — | 2.20 | — |
| 1c | Blue Reflective Pigment[1b] | — | — | — | 9.51 |
| 2a | Infrared Transparent Pigment Concentrate[2] | 8.48 | — | — | — |
| 2b | Infrared Transparent Pigment Concentrate[3] | — | 13.68 | 14.05 | 13.68 |
| 3 | Polyol Solution[4] | 11.96 | 11.96 | 11.96 | 11.96 |
| 4 | Isocyanate Solution[5] | 9.51 | 9.51 | 9.51 | 9.51 |
| 5 | Catalyst Solution[6] | 3.53 | 3.53 | 3.53 | 3.53 |

[1]SolarFlair ® 9870 commercially available from EMD Chemicals. It is TiO$_2$ coated mica flake.
[1a]Xymara Dual Pearl D21 commercially available from Ciba. This is a TiO$_2$ coated mica flake.
[1b]FireFlake ® D462 BL commercially available from Showa. This is a blue pigmented polymer coating aluminum flake.
[2]3.00 parts by weight of a polymeric pigment dispersant prepared in a manner consistent with Synthesis Example A of U.S. patent application Ser. No. 12/054,821, 5.08 parts by weight of DOWANOL ® PM Acetate (commercially available from Dow Chemical Company), and 0.86 parts by weight PALIOGEN ® Black L0086 pigment (commercially available from BASF Corporation) were added to a container and mixed with a Cowles blade for 15 minutes. This premix was then placed in a mini-basket mill for predispersion until a Hegman of 7.5 was achieved. This predispersion was then placed in an Eiger ® mill with a 75% load of 0.3 mm YTZ grind media (a ceramic milling media available commercially from Tasah Corporation). The mill was operated at 4000 fpm and recirculated for 1020 minutes. The resulting dispersion had a haze of 4.80%.

TABLE 15-continued

| Component | Description | Ex. 35 | Ex. 36 | Ex. 37 | Ex. 38 |
|---|---|---|---|---|---|

[3] 0.18 parts by weight of a polymeric pigment dispersant prepared in a manner consistent with Synthesis Example A of U.S. patent application Ser. No. 12/054,821, 0.86 parts by weight of DOWANOL ® PM Acetate (commercially available from Dow Chemical Company), and 0.21 parts by weight PALIOGEN ® Black L0086 pigment (commercially available from BASF Corporation) were added to a container and mixed with a Cowles blade for 15 minutes. This premix was then placed in a mini-basket mill with a 60% load of 1.2-1.7 mm Zirconox grind media (a ceramic milling media available commercially from Jyoti Ceramic Industries Pvt. Ltd.). The mill was operated at 2000-3000 feet per minute and recirculated for 282 minutes until a Hegman of 8.0 was achieved. The resulting dispersion had a haze value of 19.04%
[4] Commercially available as Desothane ® HS Clear Topcoat CA8000/B900A from PRC-DeSoto International, Inc.
[5] Commercially available as Desothane Activator CA8000B commercially available from PRC-DeSoto International, Inc.
[6] Commercially available as Desothane CA 8000C from PRC-DeSoto International, Inc.

Each of the coating compositions of Examples 35-38 were applied as a draw down over a black and white brushout drawdown card commercially available from Byk-Gardner under catalog number PA-2857. The coatings were cured at ambient conditions. Dry film thicknesses for each cured coating are reporting in Table 16. The coatings were analyzed for total solar reflectance and color. Results are reported in Table 16.

TABLE 16

| Test | Example 35 | Example 36 | Example 37 | Example 38 |
|---|---|---|---|---|
| Average Dry Film Thickness[1] | 2.26 | 2.59 | 3.05 | 2.97 |
| Solar Reflectance[2] | | | | |
| White Portion of Card | 46.4 | 44.1 | 44.7 | 26.4 |
| Black Portion of Card | 7.3 | 17.0 | 21.6 | 25.4 |
| Estimated Total Solar Reflectance | 3.8 | 14.9 | 20.0 | 25.3 |
| Estimated Solar Reflectance in Near-IR Range | 1.8 | 12.8 | 17.9 | 23.1 |
| Angle Dependent Color Over Black[3] | | | | |
| Observation angle: −15° | $L = 6.72$<br>$a^* = -0.48$<br>$b^* = -1.81$ | $L = 10.90$<br>$a^* = -0.24$<br>$b^* = -1.08$ | $L = 18.24$<br>$a^* = -1.45$<br>$b^* = -4.55$ | $L = 16.73$<br>$a^* = -4.75$<br>$b^* = -4.27$ |
| Observation angle: 15° | $L = 5.57$<br>$a^* = -0.53$<br>$b^* = -1.58$ | $L = 8.37$<br>$a^* = -0.31$<br>$b^* = -0.68$ | $L = 14.92$<br>$a^* = -2.67$<br>$b^* = -4.71$ | $L = 13.61$<br>$a^* = -6.55$<br>$b^* = -4.92$ |
| Observation angle: 25° | $L = 4.37$<br>$a^*, -0.46$<br>$b^* = -1.15$ | $L = 6.22$<br>$a^* = -0.33$<br>$b^* = -0.44$ | $L = 9.64$<br>$a^* = -3.14$<br>$b^* = -4.06$ | $L = 9.46$<br>$a^* = -6.83$<br>$b^* = -5.09$ |
| Observation angle: 45° | $L = 4.04$<br>$a^* = -0.30$<br>$b^* = -1.01$ | $L = 5.61$<br>$a^* = 0.07$<br>$b^* = -0.35$ | $L = 6.98$<br>$a^* = -1.61$<br>$b^* = -2.10$ | $L = 6.90$<br>$a^* = -3.75$<br>$b^* = -3.46$ |
| Observation angle: 75° | $L = 4.21$<br>$a^* = -0.56$<br>$b^* = -1.09$ | $L = 5.80$<br>$a^* = -0.34$<br>$b^* = -0.49$ | $L = 6.35$<br>$a^* = -1.03$<br>$b^* = -1.06$ | $L = 5.95$<br>$a^* = -1.86$<br>$b^* = -2.06$ |
| Observation angle: 110° | $L = 3.85$<br>$a^* = -0.42$<br>$b^* = -0.98$ | $L = 5.37$<br>$a^* = -0.33$<br>$b^* = -0.39$ | $L = 5.65$<br>$a^* = -0.65$<br>$b^* = -0.64$ | $L = 5.11$<br>$a^* = -1.02$<br>$b^* = -1.32$ |
| Angle Dependent Color Over White[3] | | | | |
| Observation angle: −15° | $L = 9.66$<br>$a^* = -0.09$<br>$b^* = -2.63$ | $L = 15.19$<br>$a^* = -0.41$<br>$b^* = -2.20$ | $L = 34.85$<br>$a^* = -2.48$<br>$b^* = -18.30$ | $L = 18.75$<br>$a^* = -3.46$<br>$b^* = -4.33$ |
| Observation angle: 15° | $L = 5.57$<br>$a^* = 0.00$<br>$b^* = -2.20$ | $L = 8.37$<br>$a^* = -0.18$<br>$b^* = -1.52$ | $L = 30.15$<br>$a^* = -4.67$<br>$b^* = -16.92$ | $L = 13.61$<br>$a^* = -4.74$<br>$b^* = -4.48$ |
| Observation angle: 25° | $L = 5.75$<br>$a^* = -0.04$<br>$b^* = 0.97$ | $L = 7.15$<br>$a^* = -0.10$<br>$b^* = 1.56$ | $L = 20.40$<br>$a^* = -5.17$<br>$b^* = -12.73$ | $L = 9.58$<br>$a^* = -5.41$<br>$b^* = 2.39$ |
| Observation angle: 45° | $L = 5.54$<br>$a^* = 0.53$<br>$b^* = -0.99$ | $L = 6.13$<br>$a^* = 0.47$<br>$b^* = -0.35$ | $L = 11.83$<br>$a^* = -3.56$<br>$b^* = -6.50$ | $L = 6.73$<br>$a^* = -3.21$<br>$b^* = -2.79$ |
| Observation angle: 75° | $L = 4.21$<br>$a^* = 0.11$<br>$b^* = -1.22$ | $L = 5.80$<br>$a^* = 0.04$<br>$b^* = -0.40$ | $L = 8.57$<br>$a^* = -2.08$<br>$b^* = -3.19$ | $L = 5.95$<br>$a^* = -1.73$<br>$b^* = -1.83$ |
| Observation angle: 110° | $L = 3.85$<br>$a^* = 0.03$<br>$b^* = -0.99$ | $L = 5.37$<br>$a^* = -0.01$<br>$b^* = -0.34$ | $L = 6.91$<br>$a^* = -1.11$<br>$b^* = -1.81$ | $L = 5.11$<br>$a^* = -1.03$<br>$b^* = -1.21$ |
| ΔE Over Black vs. White | | | | |
| Observation angle: −15° | 3.08 | 4.43 | 4.34 | 2.40 |
| Observation angle: 15° | 2.37 | 2.65 | 2.66 | 2.01 |
| Observation angle: 25° | 1.48 | 1.00 | 0.62 | 1.68 |
| Observation angle: 45° | 1.72 | 0.65 | 0.60 | 0.87 |

TABLE 16-continued

| Test | Example 35 | Example 36 | Example 37 | Example 38 |
|---|---|---|---|---|
| Observation angle: 75° | 1.34 | 0.49 | 0.42 | 0.26 |
| Observation angle: 110° | 0.96 | 0.38 | 0.31 | 0.11 |

[1] Coating thickness was measured and recorded using a PosiTector 6000 Coating Thickness Gage (DeFelsko).
[2] Solar reflectance values were calculated according to ASTM E903-96.
[3] Color measurements were made using a BYK-MAC 6-angle instrument, available from Byk-Gardner.

Examples 39-54

Coating Layer combinations were prepared using the primer and topcoat combinations of Table 17. Each of the coating compositions were applied as a draw down over a black and white brushout drawdown card commercially available from Byk-Gardner under catalog number PA-2857. The coatings were cured at ambient conditions. The topcoat was applied after the primer had cured. Dry film thicknesses for each cured coating are reporting in Table 17. The coating systems were analyzed for total solar reflectance and color. Results are reported in Table 17.

TABLE 17

| Test | Example 39 | Example 40 | Example 41 | Example 42 | Example 43 |
|---|---|---|---|---|---|
| Primer Coating Composition | Example 31 | Example 31 | Example 31 | Example 31 | Example 32 |
| Primer Average Dry Film Thickness[1] | 2.55 | 2.20 | 2.30 | 2.87 | 2.01 |
| Topcoat Coating Composition | Example 35 | Example 36 | Example 37 | Example 38 | Example 35 |
| Topcoat Average Dry Film Thickness[1] | 1.68 | 2.52 | 2.41 | 1.64 | 2.20 |
| Solar Reflectance[2] | | | | | |
| White Portion of Card | 24.8 | 29.9 | 30.7 | 25.9 | 20.8 |
| Black Portion of Card | 15.2 | 23.8 | 27.7 | 24.3 | 17.7 |
| Estimated Total Solar Reflectance | 14.3 | 23.2 | 27.5 | 24.2 | 17.5 |
| Estimated Solar Reflectance in Near-IR Range | 12.3 | 21.1 | 25.3 | 22.1 | 15.4 |
| Angle Dependent Color Over Black[3] | | | | | |
| Observation angle: −15° | $L = 12.86$ | $L = 10.78$ | $L = 16.54$ | $L = 24.40$ | $L = 8.11$ |
| | $a^* = -0.36$ | $a^* = -0.18$ | $a^* = -1.41$ | $a^* = -2.22$ | $a^* = -0.22$ |
| | $b^* = -1.80$ | $b^* = -0.97$ | $b^* = -2.76$ | $b^* = -2.98$ | $b^* = -1.42$ |
| Observation angle: 15° | $L = 8.93$ | $L = 7.81$ | $L = 11.07$ | $L = 17.39$ | $L = 6.52$ |
| | $a^* = -0.45$ | $a^* = -0.15$ | $a^* = -2.14$ | $a^* = -2.88$ | $a^* = -0.31$ |
| | $b^* = -1.86$ | $b^* = -0.62$ | $b^* = -3.33$ | $b^* = -2.94$ | $b^* = -1.37$ |
| Observation angle: 25° | $L = 6.22$ | $L = 5.93$ | $L = 7.65$ | $L = 8.74$ | $L = 4.77$ |
| | $a^*, -0.40$ | $a^* = -0.17$ | $a^* = -2.17$ | $a^* = -3.77$ | $a^* = -0.36$ |
| | $b^* = -1.37$ | $b^* = -0.45$ | $b^* = -2.66$ | $b^* = -2.97$ | $b^* = -1.27$ |
| Observation angle: 45° | $L = 5.12$ | $L = 5.58$ | $L = 6.43$ | $L = 6.08$ | $L = 4.50$ |
| | $a^* = -0.03$ | $a^* = 0.22$ | $a^* = -0.93$ | $a^* = -2.10$ | $a^* = -0.10$ |
| | $b^* = -1.05$ | $b^* = -0.30$ | $b^* = -1.26$ | $b^* = -1.86$ | $b^* = -0.98$ |
| Observation angle: 75° | $L = 5.09$ | $L = 5.73$ | $L = 6.15$ | $L = 5.86$ | $L = 4.60$ |
| | $a^* = -0.37$ | $a^* = -0.24$ | $a^* = -0.75$ | $a^* = -1.53$ | $a^* = -0.38$ |
| | $b^* = -1.17$ | $b^* = -0.43$ | $b^* = -0.83$ | $b^* = -1.49$ | $b^* = -1.13$ |
| Observation angle: 110° | $L = 4.87$ | $L = 5.24$ | $L = 5.50$ | $L = 5.27$ | $L = 4.07$ |
| | $a^* = -0.33$ | $a^* = -0.23$ | $a^* = -0.50$ | $a^* = -1.13$ | $a^* = -0.30$ |
| | $b^* = -1.03$ | $b^* = -0.33$ | $b^* = -0.53$ | $b^* = -1.27$ | $b^* = -0.99$ |
| Angle Dependent Color Over White[3] | | | | | |
| Observation angle: −15° | $L = 9.87$ | $L = 12.21$ | $L = 12.88$ | $L = 22.91$ | $L = 8.20$ |
| | $a^* = -0.30$ | $a^* = -0.34$ | $a^* = -2.49$ | $a^* = -1.72$ | $a^* = -0.45$ |
| | $b^* = -2.86$ | $b^* = -1.79$ | $b^* = -5.39$ | $b^* = -2.39$ | $b^* = -2.39$ |
| Observation angle: 15° | $L = 8.93$ | $L = 7.81$ | $L = 11.07$ | $L = 17.39$ | $L = 6.52$ |
| | $a^* = -0.38$ | $a^* = -0.20$ | $a^* = -2.75$ | $a^* = -2.37$ | $a^* = -0.51$ |
| | $b^* = -2.53$ | $b^* = -1.27$ | $b^* = -4.78$ | $b^* = -2.67$ | $b^* = -2.03$ |
| Observation angle: 25° | $L = 5.65$ | $L = 6.44$ | $L = 8.36$ | $L = 7.93$ | $L = 5.05$ |
| | $a^* = -0.39$ | $a^* = -0.20$ | $a^* = -2.54$ | $a^* = -2.91$ | $a^* = -0.41$ |
| | $b^* = 1.04$ | $b^* = 1.57$ | $b^* = 1.33$ | $b^* = 2.50$ | $b^* = 1.19$ |
| Observation angle: 45° | $L = 4.96$ | $L = 5.71$ | $L = 6.72$ | $L = 5.72$ | $L = 4.61$ |
| | $a^* = 0.06$ | $a^* = 0.21$ | $a^* = -1.05$ | $a^* = -1.41$ | $a^* = -0.02$ |
| | $b^* = -1.02$ | $b^* = -0.33$ | $b^* = -1.81$ | $b^* = -1.45$ | $b^* = -1.02$ |
| Observation angle: 75° | $L = 5.09$ | $L = 5.73$ | $L = 6.15$ | $L = 5.86$ | $L = 4.60$ |
| | $a^* = -0.26$ | $a^* = -0.21$ | $a^* = -0.89$ | $a^* = -1.03$ | $a^* = -0.39$ |
| | $b^* = -1.17$ | $b^* = -0.43$ | $b^* = -1.13$ | $b^* = -1.13$ | $b^* = -1.13$ |
| Observation angle: 110° | $L = 4.87$ | $L = 5.24$ | $L = 5.50$ | $L = 5.27$ | $L = 4.07$ |
| | $a^* = -0.25$ | $a^* = -0.21$ | $a^* = -0.63$ | $a^* = -0.81$ | $a^* = -0.33$ |
| | $b^* = -0.98$ | $b^* = -0.37$ | $b^* = -0.71$ | $b^* = -0.96$ | $b^* = -0.96$ |
| ΔE Over Black vs. White | | | | | |
| Observation angle: −15° | 3.17 | 1.65 | 4.63 | 1.68 | 1.00 |
| Observation angle: 15° | 1.43 | 1.70 | 1.57 | 1.31 | 0.70 |
| Observation angle: 25° | 0.62 | 0.57 | 1.18 | 1.24 | 0.35 |
| Observation angle: 45° | 0.19 | 0.14 | 0.63 | 0.88 | 0.15 |

TABLE 17-continued

| | | | | | |
|---|---|---|---|---|---|
| Observation angle: 75° | 0.22 | 0.13 | 0.37 | 0.68 | 0.06 |
| Observation angle: 110° | 0.48 | 0.12 | 0.22 | 0.51 | 0.12 |

| Test | Example 44 | Example 45 | Example 46 | Example 47 | Example 48 |
|---|---|---|---|---|---|
| Primer Coating Composition | Example 32 | Example 32 | Example 32 | Example 33 | Example 33 |
| Primer Average Dry Film Thickness[1] | 2.17 | 2.34 | 2.51 | 1.90 | 1.86 |
| Topcoat Coating Composition | Example 36 | Example 37 | Example 38 | Example 35 | Example 36 |
| Topcoat Average Dry Film Thickness[1] | 1.84 | 1.63 | 2.07 | 2.44 | 2.38 |
| Solar Reflectance[2] | | | | | |
| White Portion of Card | 27.7 | 28.2 | 25.6 | 19.5 | 27.5 |
| Black Portion of Card | 26.5 | 28.3 | 25.5 | 18.4 | 27.5 |
| Estimated Total Solar Reflectance | 26.3 | 27.9 | 25.5 | 18.4 | 27.0 |
| Estimated Solar Reflectance in Near-IR Range | 24.2 | 25.7 | 23.4 | 16.3 | 25.0 |
| Angle Dependent Color Over Black[3] | | | | | |
| Observation angle: −15° | L = 9.65<br>a* = −0.25<br>b* = −1.18 | L = 10.41<br>a* = −1.68<br>b* = −3.94 | L = 19.19<br>a* = −1.44<br>b* = −2.21 | L = 11.08<br>a* = −0.43<br>b* = −2.09 | L = 13.27<br>a* = −0.33<br>b* = −1.55 |
| Observation angle: 15° | L = 7.70<br>a* = −0.17<br>b* = −0.80 | L = 9.69<br>a* = −2.88<br>b* = −4.18 | L = 13.82<br>a* = −1.68<br>b* = −1.85 | L = 7.80<br>a* = −0.44<br>b* = −1.93 | L = 10.10<br>a* = −0.26<br>b* = −1.08 |
| Observation angle: 25° | L = 5.88<br>a*, −0.21<br>b* = −0.45 | L = 8.07<br>a* = −2.86<br>b* = −3.46 | L = 6.84<br>a* = −1.87<br>b* = −1.82 | L = 5.43<br>a* = −0.45<br>b* = −1.42 | L = 6.89<br>a* = −0.19<br>b* = −0.52 |
| Observation angle: 45° | L = 5.52<br>a* = 0.18<br>b* = −0.27 | L = 6.72<br>a* = −1.37<br>b* = −1.61 | L = 5.44<br>a* = −0.96<br>b* = −1.08 | L = 4.67<br>a* = −0.12<br>b* = −1.01 | L = 5.93<br>a* = 0.19<br>b* = −0.31 |
| Observation angle: 75° | L = 5.72<br>a* = −0.24<br>b* = −0.43 | L = 6.29<br>a* = −0.85<br>b* = −0.91 | L = 5.45<br>a* = −0.83<br>b* = −0.98 | L = 4.68<br>a* = −0.42<br>b* = −1.14 | L = 6.04<br>a* = −0.26<br>b* = −0.43 |
| Observation angle: 110° | L = 5.25<br>a* = −0.23<br>b* = −0.34 | L = 5.58<br>a* = −0.52<br>b* = −0.58 | L = 4.89<br>a* = −0.59<br>b* = −0.81 | L = 4.30<br>a* = −0.33<br>b* = −0.98 | L* = 5.73<br>a* = −0.26<br>b* = −0.34 |
| Angle Dependent Color Over White[3] | | | | | |
| Observation angle: −15° | L = 10.94<br>a* = −0.20<br>b* = −1.62 | L = 13.18<br>a* = −2.38<br>b* = −5.94 | L = 20.27<br>a* = −1.52<br>b* = −2.90 | L = 8.72<br>a* = −0.52<br>b* = −2.54 | L = 12.51<br>a* = −0.36<br>b* = −2.35 |
| Observation angle: 15° | L = 7.70<br>a* = −0.19<br>b* = −1.08 | L = 9.69<br>a* = −2.83<br>b* = −4.92 | L = 13.82<br>a* = −1.64<br>b* = −2.58 | L = 7.80<br>a* = −0.49<br>b* = −2.14 | L = 10.10<br>a* = −0.29<br>b* = −1.76 |
| Observation angle: 25° | L = 6.19<br>a* = −0.16<br>b* = 1.96 | L = 8.36<br>a* = −2.66<br>b* = 1.55 | L = 7.81<br>a* = −1.93<br>b* = 2.54 | L = 5.05<br>a* = −0.42<br>b* = 1.61 | L = 6.76<br>a* = −0.22<br>b* = 2.03 |
| Observation angle: 45° | L = 5.63<br>a* = 0.19<br>b* = −0.29 | L = 6.72<br>a* = −1.24<br>b* = −2.01 | L = 5.69<br>a* = −1.14<br>b* = −1.25 | L = 4.54<br>a* = −0.12<br>b* = −0.98 | L = 5.74<br>a* = 0.16<br>b* = −0.38 |
| Observation angle: 75° | L = 5.72<br>a* = −0.23<br>b* = −0.46 | L = 6.29<br>a* = −0.98<br>b* = −1.19 | L = 5.45<br>a* = −0.91<br>b* = −1.06 | L = 4.68<br>a* = −0.39<br>b* = −1.15 | L = 6.04<br>a* = −0.25<br>b* = −0.49 |
| Observation angle: 110° | L = 5.25<br>a* = −0.24<br>b* = −0.38 | L = 5.58<br>a* = −0.66<br>b* = −0.74 | L = 4.89<br>a* = −0.60<br>b* = −0.79 | L = 4.30<br>a* = −0.36<br>b* = −0.96 | L = 5.73<br>a* = −0.26<br>b* = −0.37 |
| ΔE Over Black vs. White | | | | | |
| Observation angle: −15° | 1.36 | 3.49 | 1.29 | 2.41 | 1.11 |
| Observation angle: 15° | 0.85 | 1.36 | 1.42 | 1.00 | 0.70 |
| Observation angle: 25° | 0.32 | 0.52 | 1.05 | 0.40 | 0.39 |
| Observation angle: 45° | 0.11 | 0.41 | 0.35 | 0.14 | 0.20 |
| Observation angle: 75° | 0.07 | 0.30 | 0.13 | 0.11 | 0.24 |
| Observation angle: 110° | 0.08 | 0.23 | 0.04 | 0.19 | 0.42 |

| Test | Example 49 | Example 50 | Example 51 | Example 52 | Example 53 | Example 54 |
|---|---|---|---|---|---|---|
| Primer Coating Composition | Example 33 | Example 33 | Example 34 | Example 34 | Example 34 | Example 34 |
| Primer Average Dry Film Thickness[1] | 2.28 | 2.29 | 2.14 | 1.27 | 2.20 | 2.01 |
| Topcoat Coating Composition | Example 37 | Example 38 | Example 35 | Example 36 | Example 37 | Example 38 |
| Topcoat Average Dry Film Thickness[1] | 2.68 | 2.31 | 1.69 | 3.03 | 2.44 | 2.75 |
| Solar Reflectance[2] | | | | | | |
| White Portion of Card | 28.2 | 25.5 | 21.4 | 27.8 | 28.7 | 26.0 |
| Black Portion of Card | 27.3 | 24.7 | 21.4 | 27.4 | 29.1 | 25.7 |
| Estimated Total Solar Reflectance | 27.2 | 24.6 | 21.3 | 27.3 | 28.6 | 25.7 |
| Estimated Solar Reflectance in Near-IR Range | 25.1 | 22.6 | 19.3 | 25.2 | 26.5 | 23.6 |

TABLE 17-continued

Angle Dependent Color Over Black[3]

| | | | | | | |
|---|---|---|---|---|---|---|
| Observation angle: −15° | L = 14.10 | L = 14.71 | L = 6.90 | L = 8.54 | L = 11.79 | L = 16.91 |
| | a* = −1.50 | a* = −1.53 | a* = −0.39 | a* = −0.18 | a* = −1.22 | a* = −3.01 |
| | b* = −4.74 | b* = −2.61 | b* = −1.56 | b* = −0.86 | b* = −3.16 | b* = −3.15 |
| Observation angle: 15° | L = 11.75 | L = 9.91 | L = 5.75 | L = 6.99 | L = 10.55 | L = 12.92 |
| | a* = −2.32 | a* = −1.22 | a* = −0.46 | a* = −0.11 | a* = −2.07 | a* = −3.80 |
| | b* = −4.51 | b* = −1.73 | b* = −1.44 | b* = −0.53 | b* = −2.96 | b* = −3.43 |
| Observation angle: 25° | L = 8.60 | L = 5.97 | L = 4.65 | L = 5.61 | L = 7.73 | L = 7.82 |
| | a*, −2.31 | a* = −1.09 | a* = −0.39 | a* = −0.14 | a* = −2.16 | a* = −4.17 |
| | b* = −3.43 | b* = −1.29 | b* = −1.23 | b* = −0.43 | b* = −2.17 | b* = −3.69 |
| Observation angle: 45° | L = 6.67 | L = 5.14 | L = 4.47 | L = 5.47 | L = 6.28 | L = 6.02 |
| | a* = −1.03 | a* = −0.57 | a* = −0.09 | a* = 0.17 | a* = −0.77 | a* = −2.21 |
| | b* = −1.66 | b* = −0.86 | b* = −0.99 | b* = −0.27 | b* = −0.98 | b* = −2.23 |
| Observation angle: 75° | L = 6.22 | L = 5.25 | L = 4.57 | L = 5.69 | L = 6.04 | L = 5.67 |
| | a* = −0.79 | a* = −0.69 | a* = −0.36 | a* = −0.24 | a* = −0.66 | a* = −1.35 |
| | b* = −0.98 | b* = −0.88 | b* = −1.15 | b* = −0.43 | b* = −0.73 | b* = −1.55 |
| Observation angle: 110° | L = 5.55 | L = 4.75 | L = 4.14 | L = 5.23 | L = 5.44 | L = 4.97 |
| | a* = −0.54 | a* = −0.50 | a* = −0.32 | a* = −0.26 | a* = −0.46 | a* = −0.79 |
| | b* = −0.58 | b* = −0.68 | b* = −0.97 | b* = −0.34 | b* = −0.50 | b* = −1.03 |

Angle Dependent Color Over White[3]

| | | | | | | |
|---|---|---|---|---|---|---|
| Observation angle: −15° | L = 12.90 | L = 19.27 | L = 7.33 | L = 11.50 | L = 13.12 | L = 23.45 |
| | a* = −2.27 | a* = −1.49 | a* = −0.44 | a* = −0.36 | a* = −1.83 | a* = −2.33 |
| | b* = −5.43 | b* = −3.04 | b* = −1.99 | b* = −1.95 | b* = −4.52 | b* = −3.32 |
| Observation angle: 15° | L = 11.75 | L = 9.91 | L = 5.75 | L = 6.99 | L = 10.55 | L = 17.89 |
| | a* = −2.96 | a* = −1.82 | a* = −0.47 | a* = −0.24 | a* = −2.30 | a* = −3.05 |
| | b* = −4.86 | b* = −2.87 | b* = −1.68 | b* = −1.43 | b* = −3.84 | b* = −3.20 |
| Observation angle: 25° | L = 8.64 | L = 7.73 | L = 4.73 | L = 6.55 | L = 8.07 | L = 9.37 |
| | a* = −2.92 | a* = −2.19 | a* = −0.37 | a* = −0.23 | a* = −2.40 | a* = −4.07 |
| | b* = 2.02 | b* = 2.74 | b* = 1.80 | b* = 1.86 | b* = 2.22 | b* = −3.16 |
| Observation angle: 45° | L = 6.81 | L = 5.76 | L = 4.48 | L = 5.75 | L = 6.61 | L = 6.27 |
| | a* = −1.32 | a* = −1.31 | a* = −0.09 | a* = 0.18 | a* = −1.16 | a* = −2.30 |
| | b* = −1.96 | b* = −1.43 | b* = −0.96 | b* = −0.37 | b* = −1.63 | b* = −2.11 |
| Observation angle: 75° | L = 6.22 | L = 5.25 | L = 4.57 | L = 5.69 | L = 6.04 | L = 5.77 |
| | a* = −1.04 | a* = −1.06 | a* = −0.38 | a* = −0.28 | a* = −0.84 | a* = −1.33 |
| | b* = −1.14 | b* = −1.19 | b* = −1.13 | b* = −0.46 | b* = −0.99 | b* = −1.49 |
| Observation angle: 110° | L = 5.55 | L = 4.75 | L = 4.14 | L = 5.23 | L = 5.44 | L = 5.08 |
| | a* = −0.68 | a* = −0.73 | a* = −0.30 | a* = −0.26 | a* = −0.56 | a* = −0.84 |
| | b* = −0.69 | b* = −0.92 | b* = −0.98 | b* = −0.37 | b* = −0.61 | b* = −1.08 |

ΔE Over Black vs. White

| | | | | | | |
|---|---|---|---|---|---|---|
| Observation angle: −15° | 1.58 | 4.58 | 0.61 | 3.16 | 2.00 | 6.57 |
| Observation angle: 15° | 0.90 | 4.35 | 0.42 | 2.48 | 0.92 | 5.03 |
| Observation angle: 25° | 0.65 | 2.40 | 0.13 | 1.02 | 1.04 | 1.64 |
| Observation angle: 45° | 0.44 | 1.12 | 0.03 | 0.30 | 0.83 | 0.29 |
| Observation angle: 75° | 0.31 | 0.59 | 0.03 | 0.18 | 0.35 | 0.12 |
| Observation angle: 110° | 0.18 | 0.39 | 0.05 | 0.17 | 0.15 | 0.13 |

[1]Coating thickness was measured and recorded using a PosiTector 6000 Coating Thickness Gage (DeFelsko).
[2]Solar reflectance values were calculated according to ASTM E903-96.
[3]Color measurements were made using a BYK-MAC 6-angle instrument, available from Byk-Gardner.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
    (a) a film-forming resin;
    (b) colored and/or opaque infrared reflective pigment particles;
    (c) infrared transparent pigment particle; and
    (d) a tri-block copolymer pigment dispersant;
    wherein the colored and/or opaque infrared reflective pigment and the infrared transparent pigment are separate and different components and are separately dispersed in the coating composition and wherein the coating composition, when formed into a cured coating, exhibits:
        (1) a total solar reflectance of at least 15% as measured in accordance with ASTM E 903-96; and
        (2) an angle dependent color change of no more than 5 ΔE units at a viewing angle from 110° to −15° when compared to the color of a control coating not containing the colored and/or opaque infrared reflective pigment particles (b).

2. The coating composition of claim 1, wherein the cured coating further exhibits an angle dependent CIELAB L* value of no more than 50 at an observation angle of 25°.

3. The coating composition of claim 2, wherein the angle dependent CIELAB L* value is no more than 25.

4. The coating composition of claim 1, wherein the total solar reflectance is at least 25%.

5. The coating composition of claim 1, wherein the tri-block copolymer comprises:
    (a) a first segment comprising infrared transparent pigment affinic groups;
    (b) a second segment comprising polar groups; and
    (c) a third segment which is different from the first segment and the second segment.

6. The coating composition of claim 5, wherein the infrared transparent pigment affinic groups comprise aromatic groups.

7. The coating composition of claim 5, wherein the third segment is substantially non-polar and substantially free of infrared transparent pigment affinic groups.

8. The coating composition of claim 1, wherein the tri-block copolymer pigment dispersant has a polymer chain structure represented by the general formula:

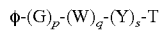

wherein:
(a) G is a residue of at least one radically polymerizable ethylenically unsaturated monomer;
(b) W and Y are residues of at least one radically polymerizable ethylenically unsaturated monomer; with W and Y being different from one another;
(c) φ is a hydrophobic residue of or derived from an initiator and is free of a radically transferable group of the initiator;
(d) T is or is derived from the radically transferable group of the initiator; and
(e) p, q, and s are each individually selected such that the pigment dispersant has a number average molecular weight of at least 250.

9. The coating composition of claim 1, wherein the tri-block copolymer pigment dispersant comprising:
(i) a first block comprising an oxirane functional monomer reacted with a carboxylic acid;
(ii) a second block comprising (meth)acrylic acid alkyl esters; and
(iii) a third block comprising (meth)acrylic acid alkyl esters.

10. The coating composition of claim 1, wherein the infrared reflective pigment particles have a ratio of reflectivity in the near-infrared region to reflectivity in the visible region of greater than 1:1.

11. The coating composition of claim 1, wherein the infrared reflective pigment particles comprise an interference pigment.

12. The coating composition of claim 1, wherein the infrared transparent pigment particles comprise an organic pigment.

13. The coating composition of claim 12, wherein the organic pigment comprises aromatic groups.

14. The coating composition of claim 13, wherein the organic pigment comprises a perylene-based pigment.

15. A multi-component composite coating comprising:
(a) a first coating exhibiting a CIELAB L* value of no more than 50 and a total solar reflectance of at least 15% as measured in accordance with ASTM E 903-96 and deposited from a first coating composition comprising:
(i) a film-forming resin;
(ii) colored and/or opaque infrared reflective pigment particles;
(iii) infrared transparent pigment particles; and
(iv) a tri-block copolymer pigment dispersant;
wherein the colored and/or opaque infrared reflective pigment and the infrared transparent pigment are separate and different components and are separately dispersed in the first coating composition, and
wherein the first coating composition, when formed into a cured coating, exhibits an angle dependent color change of no more than 5 ΔE units at a viewing angle from 110° to −15° when compared to the color of a control coating not containing the infrared reflective pigment particles (ii); and
(b) a second coating deposited beneath at least a portion of the first coating, the second coating being deposited from a second coating composition comprising:
(i) a film-forming resin;
(ii) infrared reflective flake pigment particles; and
(iii) infrared reflective inorganic oxide pigment particles;
wherein the infrared reflective flake pigment and the infrared reflective inorganic oxide pigment are separate and different components of the second coating coating composition.

16. The composite coating of claim 15, wherein the sum of (b)(ii) and (b)(iii) in the second coating composition from which the second coating is deposited is no more than 10% by weight, based on the total solids weight of the second coating composition.

* * * * *